US012732478B2

United States Patent
Van Oort

(10) Patent No.: US 12,732,478 B2
(45) Date of Patent: *Sep. 8, 2026

(54) SYSTEMS, METHODS AND APPARATUS FOR LOCAL AREA NETWORK ISOLATION

(71) Applicant: R & D Industries, Inc., Milford, IA (US)

(72) Inventor: Donald Van Oort, West Okoboji, IA (US)

(73) Assignee: R & D Industries, Inc., Milford, IA (US)

(*) Notice: Subject to any disclaimer, the term of this patent is extended or adjusted under 35 U.S.C. 154(b) by 25 days.

This patent is subject to a terminal disclaimer.

(21) Appl. No.: 18/477,349

(22) Filed: Sep. 28, 2023

(65) Prior Publication Data

US 2024/0129275 A1 Apr. 18, 2024

Related U.S. Application Data

(63) Continuation of application No. 16/032,924, filed on Jul. 11, 2018, now Pat. No. 11,985,109.

(60) Provisional application No. 62/531,231, filed on Jul. 11, 2017.

(51) Int. Cl.

| | |
|---|---|
| ***H04L 29/06*** | (2006.01) |
| ***H04L 9/40*** | (2022.01) |
| ***H04L 12/46*** | (2006.01) |
| ***H04L 65/102*** | (2022.01) |
| ***H04L 67/104*** | (2022.01) |

(52) U.S. Cl.

CPC ...... *H04L 63/0227* (2013.01); *H04L 12/4641* (2013.01); *H04L 63/10* (2013.01); *H04L 63/1408* (2013.01); *H04L 65/102* (2013.01); *H04L 67/104* (2013.01)

(58) Field of Classification Search

CPC . H04L 63/0227; H04L 63/1408; H04L 63/20; H04L 63/145; H04W 12/12

See application file for complete search history.

(56) References Cited

U.S. PATENT DOCUMENTS

| | | | | |
|---|---|---|---|---|
| 7,640,585 | B2 | 12/2009 | Lee | |
| 8,249,028 | B2 | 8/2012 | Porras | |
| 8,718,558 | B2 | 5/2014 | Montemurro | |
| 8,996,873 | B1 * | 3/2015 | Pahl | H04L 67/01 713/168 |
| 9,980,213 | B2 * | 5/2018 | Lynch | H04W 28/0268 |
| 10,389,631 | B2 | 8/2019 | Sheldon | |
| 2008/0005285 | A1 * | 1/2008 | Robinson | H04L 41/0894 709/220 |

* cited by examiner

*Primary Examiner* — Longbit Chai

(74) *Attorney, Agent, or Firm* — DENTONS DAVIS BROWN PC; Matthew Warner-Blankenship; Kassandra Rittmer

(57) ABSTRACT

The disclosed apparatus, systems and methods relate to methods, systems, and devices for the isolation of devices on a LAN network. Route poisoning, ARP poisoning null routing, blackhole and/or firewall blocking are employed to prevent peer-to-peer network communications within the local area network.

18 Claims, 26 Drawing Sheets

Normal Operation, TCP Connection Establishment
using Three-way Handshake

Normal - ARP Broadcase Process

ARP process where Machine-2 has a poisoned ARP entry for 10.10.10.40

Blocking Windows Host Communications with Poisoned Routing:

10

70

| Network ID: | | | | | | | |
|---|---|---|---|---|---|---|---|
| Notes: | | | | | | | |
| Mask: 255.255 | .255.0 | .255.128 | .255.192 | .255.224 | .255.240 | .255.243 | .255.252 |
| Hosts per unit | 254 | 126 | 62 | 30 | 14 | 6 | 2 |
| Slash Notation | /24 | /25 | /26 | /27 | /28 | /29 | /30 |
| | .0 [.1-.254] | .0 [.1-.126] | .0 [.1-.62] | .0 [.1-.30] | .0 [.1-.14] | .0 [.1-.6] | .0 [.1-.2] |
| | | | | | | | .4 [.5-.6] |
| | | | | | | .8 [.3-.14] | .8 [.9-.10] |
| | | | | | | | .12 [.13-.14] |
| | | | | | .16 [.17-.30] | .16 [.17-.22] | .16 [.17-.18] |
| | | | | | | | .20 [.21-.22] |
| | | | | | | .24 [.25-.30] | .24 [.25-.26] |
| | | | | | | | .28 [.29-.30] |
| | | | | .32 [.33-.62] | .32 [.33-.45] | .32 [.23-.38] | .32 [.33-.34] |
| | | | | | | | .36 [.37-.38] |
| | | | | | | .40 [.41-.45] | .40 [.41-.42] |
| | | | | | | | .44 [.45-.46] |
| | | | | | .48 [.49-.62] | .48 [.49-.54] | .48 [.49-.50] |
| | | | | | | | .52 [.53-.54] |
| | | | | | | .56 [.57-.62] | .56 [.57-.58] |
| | | | | | | | .60 [.61-.62] |
| | | | .64 [.65-.128] | .64 [.65-.34] | .64 [.65-.78] | .64 [.65-.70] | .64 [.65-.66] |
| | | | | | | | .68 [.69-.70] |
| | | | | | | .72 [.73-.78] | .72 [.73-.74] |
| | | | | | | | .76 [.77-.78] |
| | | | | | .80 [.81-.94] | .80 [.81-.85] | .80 [.81-.82] |
| | | | | | | | .84 [.85-.86] |
| | | | | | | .88 [.85-.94] | .88 [.89-.90] |
| | | | | | | | .92 [.93-.94] |
| | | | | .96 [.97-.126] | .96 [.97-.110] | .96 [.97- | .96 [.97-.95] |
| | | | | | | | .100 [.101-.102] |
| | | | | | | .104 [.105-.110] | .104 [.105-.106] |
| | | | | | | | .108 [.109-.110] |
| | | | | | .112 [.113-.126] | .112 [.113- | .112 [.113-.114] |
| | | | | | | | .116 [.117-.118] |
| | | | | | | .120 [.121- | .120 [.121-.122] |
| | | | | | | | .124 [.125-.126] |
| | | .128 [.129-.254] | .128 [.129-.130] | .120 [.129-.156] | .128 [.133-.143] | .128 [.129- | .128 [.129-.130] |
| | | | | | | | .132 [.133-.134] |
| | | | | | | .136 [.137- | .136 [.138-.139] |
| | | | | | | | .140 [.141-.142] |
| | | | | | .144 [.155-.158] | .144 [.145- | .144 [.145-.146] |
| | | | | | | | .148 [.149-.150] |
| | | | | | | .152 [.153- | .152 [.153-.154] |
| | | | | | | | .156 [.157-.158] |
| | | | | .160 [.161-.190] | .160 [.161-.174] | .160 [.161- | .160 [.161-.162] |
| | | | | | | | .164 [.165-.166] |
| | | | | | | .168 [.169- | .168 [.169-.170] |
| | | | | | | | .172 [.173-.174] |
| | | | | | .176 [.177-.130] | .176 [.177- | .176 [.177-.178] |
| | | | | | | | .180 [.181-.182] |
| | | | | | | .184 [.185- | .184 [.185-.186] |
| | | | | | | | .188 [.189-.190] |
| | | | .192 [.133-.254] | .192 [.193-.222] | .192 [.193-.206] | .192 [.196- | .192 [.193-.194] |
| | | | | | | | .196 [.197-.198] |
| | | | | | | .200 [.201- | .200 [.201-.202] |
| | | | | | | | .204 [.205-.206] |
| | | | | | .208 [.209-.222] | .208 [.209- | .208 [.209-.210] |
| | | | | | | | .212 [.213-.214] |
| | | | | | | .216 [.217- | .216 [.217-.218] |
| | | | | | | | .220 [.221-.222] |
| | | | | .224 [.225-.254] | .224 [.225-.238] | .224 [.225- | .224 [.225-.226] |
| | | | | | | | .228 [.229-.230] |
| | | | | | | .232 [.223- | .232 [.233-.234] |
| | | | | | | | .236 [.237-.238] |
| | | | | | .240 [.241-.254] | .240 [.241- | .240 [.241-.242] |
| | | | | | | | .244 [.245-.246] |
| | | | | | | .248 [.249- | .248 [.249-.250] |
| | | | | | | | .252 [.253-.254] |

| Network ID: | | | | | | | |
|---|---|---|---|---|---|---|---|
| Notes: | | | | | | | |
| Mask: 255.255 | .255.0 | .255.128 | .255.192 | .255.224 | .255.240 | .255.243 | .255.252 |
| Hosts per unit | 254 | 126 | 62 | 30 | 14 | 6 | 2 |
| Slash Notation | /24 | /25 | /26 | /27 | /28 | /29 | /30 |
| | .0 [.1-.254] | .0 [.1-.126] | .0 [.1-.62] | .0 [.1-.30] | .0 [.1-.14] | .0 [.1-.6] | .0 [.1-.2] |
| | | | | | | | .4 [.5-.6] |
| | | | | | | .8 [.3-.14] | .8 [.9-.10] |
| | | | | | | | .12 [.13-.14] |
| | | | | | .16 [.17-.30] | .16 [.17-.22] | .16 [.17-.18] |
| | | | | | | | .20 [.21-.22] |
| | | | | | | .24 [.25-.30] | .24 [.25-.26] |
| | | | | | | | .28 [.29-.30] |
| | | | | .32 [.33-.62] | .32 [.33-.45] | .32 [.23-.38] | .32 [.33-.34] |
| | | | | | | | .36 [.37-.38] |
| | | | | | | .40 [.41-.45] | .40 [.41-.42] |
| | | | | | | | .44 [.45-.46] |
| | | | | | .48 [.49-.62] | .48 [.49-.54] | .48 [.49-.50] |
| | | | | | | | .52 [.53-.54] |
| | | | | | | .56 [.57-.62] | .56 [.57-.58] |
| | | | | | | | .60 [.61-.62] |
| | | | .64 [.65-.128] | .64 [.65-.34] | .64 [.65-.78] | .64 [.65-.70] | .64 [.65-.66] |
| | | | | | | | .68 [.69-.70] |
| | | | | | | .72 [.73-.78] | .72 [.73-.74] |
| | | | | | | | .76 [.77-.78] |
| | | | | | .80 [.81-.94] | .80 [.81-.85] | .80 [.81-.82] |
| | | | | | | | .84 [.85-.86] |
| | | | | | | .88 [.85-.94] | .88 [.89-.90] |
| | | | | | | | .92 [.93-.94] |
| | | | | .96 [.97-.126] | .96 [.97-.110] | .96 [.97- | .96 [.97-.95] |
| | | | | | | | .100 [.101-.102] |
| | | | | | | .104 [.105-.110] | .104 [.105-.106] |
| | | | | | | | .108 [.109-.110] |
| | | | | | .112 [.113-.126] | .112 [.113- | .112 [.113-.114] |
| | | | | | | | .116 [.117-.118] |
| | | | | | | .120 [.121- | .120 [.121-.122] |
| | | | | | | | .124 [.125-.126] |
| | | .128 [.129-.254] | .128 [.129-.130] | .120 [.129-.156] | .128 [.133-.143] | .128 [.129- | .128 [.129-.130] |
| | | | | | | | .132 [.133-.134] |
| | | | | | | .136 [.137- | .136 [.138-.139] |
| | | | | | | | .140 [.141-.142] |
| | | | | | .144 [.155-.158] | .144 [.145- | .144 [.145-.146] |
| | | | | | | | .148 [.149-.150] |
| | | | | | | .152 [.153- | .152 [.153-.154] |
| | | | | | | | .156 [.157-.158] |
| | | | | .160 [.161-.190] | .160 [.161-.174] | .160 [.161- | .160 [.161-.162] |
| | | | | | | | .164 [.165-.166] |
| | | | | | | .168 [.169- | .168 [.169-.170] |
| | | | | | | | .172 [.173-.174] |
| | | | | | .176 [.177-.130] | .176 [.177- | .176 [.177-.178] |
| | | | | | | | .180 [.181-.182] |
| | | | | | | .184 [.185- | .184 [.185-.186] |
| | | | | | | | .188 [.189-.190] |
| | | | .192 [.133-.254] | .192 [.193-.222] | .192 [.193-.206] | .192 [.196- | .192 [.193-.194] |
| | | | | | | | .196 [.197-.198] |
| | | | | | | .200 [.201- | .200 [.201-.202] |
| | | | | | | | .204 [.205-.206] |
| | | | | | .208 [.209-.222] | .208 [.209- | .208 [.209-.210] |
| | | | | | | | .212 [.213-.214] |
| | | | | | | .216 [.217- | .216 [.217-.218] |
| | | | | | | | .220 [.221-.222] |
| | | | | .224 [.225-.254] | .224 [.225-.238] | .224 [.225- | .224 [.225-.226] |
| | | | | | | | .228 [.229-.230] |
| | | | | | | .232 [.223- | .232 [.233-.234] |
| | | | | | | | .236 [.237-.238] |
| | | | | | .240 [.241-.254] | .240 [.241- | .240 [.241-.242] |
| | | | | | | | .244 [.245-.246] |
| | | | | | | .248 [.249- | .248 [.249-.250] |
| | | | | | | | .252 [.253-.254] |

Table 1:Host Based Technology Comparison

| | ARP Poisoning Layer-2 | Host Based Null Routing or Route Poisoning Layer-3 | Host Based Firewall Capability Layer-7 (Block/Allow) | Host Based Firewall Capability Layer-7 Advanced (IPSEC, Port or Application |
|---|---|---|---|---|
| LIMITING PEER TO PEER TRAFFIC WITHIN A LAN: LanIsolation can limit peer-to-peer traffic to a host using LanIsolation techniques within a normal Ethernet LAN segment which uses IPv4. LanIsolation uses host-based technology which does not depend on networking hardware or adaptation of the network architecture. These filtering methods block the ability of malware to exploit zero-day vulnerabilities, because they eliminate the ability for devices (computers) to communicate within the LAN and prevent the proliferation of malware. Even when zero-day attack vectors would normally allow malware to spread rapidly across a shared LAN segment, LanIsolation can make it impossible. | ✓ | ✓ | ✓ | ✓ |
| LIMITING LATERAL MOVEMENT BY A HACKER WITHIN A LAN: LanIsolation can limit peer-to-peer traffic to a host within a LAN segment using host-based technology which does not depend on networking hardware or adaptation of the network architecture. These filtering methods block the ability of a hacker to move laterally within a network segment to a host protected by LanIsolation from a host which is blocked using LanIsolation techniques. Lateral movement within a network can be blocked at a low level, making it impossible for a hacker to move between computers on a protected LAN segment, because LanIsolation eliminates the ability of computers to communicate within the LAN. | ✓ | ✓ | ✓ | ✓ |
| BLOCKING CONNECTIVITY DOES NOT BREAK ARP: LanIsolation can limit peer-to-peer traffic to a host using LanIsolation techniques within a normal Ethernet LAN segment which uses IPv4. LanIsolation uses host-based technology which does not depend on networking hardware or adaptation of the network architecture. While blocking peer-to-peer traffic, these methods, are effective at limiting traffic on the network. One critically important aspect of all three methods is that the do not break the fundamental network discovery mechanisms of Ethernet with respect to ARP. More specifically, when hosts are isolated using any or all of the three described methods, this does not prevent these hosts from participating in ARP discovery. This is necessary to prevent multiple devices from using the same IP address and is also necessary for Ethernet switches to determine the location of endpoints which populate the switches CAM table based on monitoring ARP. | ✓ | ✓ | ✓ | ✓ |
| INTEGRATION WITH DHCP SERVER: LanIsolation is easily understood in the context of a network with static IP addresses, however it can also work in conjunction with DHCP, where a sofware agent running on a machine to be isolated can securely connect to a server and where the server can communicate a mapping of assigned IP addresses to hostnames. Based on the mapping information the client agent, running with system level permissions can dynamically adjust the LanIsolation settings to add, remove or modify settings to affect changes as necessary. | ✓ | ✓ | ✓ | ✓ |
| CLOUD BASED MANAGEMENT: LanIsolation can be configured to work with cloud based management servers, thereby allowing client computers to dynamically adjust to configuration settings as defined by a network administrator. | ✓ | ✓ | ✓ | ✓ |
| CAN BLOCK CONNECTIONS WITHIN A LAN: Can provide protection to a host on a shared LAN segment from attack from other hosts by blocking traffic to/from undesired hosts. | ✓ | ✓ | ✓ | ✓ |
| CAN BLOCK CONNECTIONS TO HOSTS OUSIDE A LAN SEGMENT: Can provide protection to a host on a shared LAN segment from attack from other hosts by blocking traffic to/from undesired hosts even if the blocked host is on another network segment or on the Internet. | ✗ | ✓ | ✓ | ✓ |
| GRANULAR BLOCKING BASED ON PORT OR PROTOCOL: Can provide protection to a host on a shared LAN segment from attack from other hosts by blocking unnecessary ports, applications or specific users. | ✗ | ✗ | ✗ | ✓ |

FIG. 8

Table 1: Host Based Technology Comparison - continued

| | | | | |
|---|---|---|---|---|
| PROTECTING HIGH VALUE, HIGH SECURITY HOSTS ON A LAN SEGMENT: Can provide protection to other high-value hosts on a shared LAN segment from attack by other hosts. | ✓ | ✓ | ✓ | ✓ |
| AI INTEGRATED MANAGEMENT: LanIsolation can be configured to work with Artificial Intelligence (AI) and/or Machine Learning (ML) and can be controlled by AI to rapidly respond to malware or hacker events based on network traffic or based on conditions identified by AI and/or ML. | ✓ | ✓ | ✓ | ✓ |
| PROTECTION OF LEGACY SYSTEMS ON A LAN SEGMENT:Can provide protection to a legacy system running an old, outdated or even unsupported OS such as Windows XP which may be in-use for a specialty control system or application. Windows firewall has evolved, so a subset of these features are available in Windows XP and a more mature set of features is available in current Windows 10 firewall. Similarly firewalls in various operating systems provide features that may be comparable to Windows. | ✓ | ✓ | │ | │ |
| PREVENT ARP DISCOVERY OF A PROTECTED HOST ON THE SAME LAN FROM NON-PROTECTED HOST: Can prevent a host from being discoverable on the LAN from another PC that does not have filtering applied. | ✗ | ✗ | ✗ | ✗ |
| PREVENT DISCOVERY OF UNPROTECTED HOSTS ON THE SAME LAN FROM A PROTECTED HOST: Can prevent a host on the LAN where LanIsolation is applied, from discovering other PCs/hosts that do not have filtering applied. Complete blocking is described as blocking ARP from other hosts, making them undiscoverable from the machine where LanIsolation is applied. Unless a user has Administrative rights on the PC where LanIsolation is applied these filtering rules prevent the machine from discovering or connecting to other devices on the LAN. | ✓ | ✗ | ✗ | ✗ |
| PREVENT ICMP (PING): Can prevent a host from being able to connect to, or to be pingable from other PC's on the LAN, when these isolation techniques are used on the isolated PC. | ✓ | ✓ | ✓ | ✓ |
| SCALABILITY: Well suited to blocking traffic within a /24 (or smaller) networks | ✓ | ✓ | ✓ | ✓ |
| SCALABILITY: Well suited to work in larger networks; supernets larger than /24 | ✗ | ✓ | ✓ | ✓ |
| SECURITY OF SETTINGS (WINDOWS): Rules can persist across reboots and cannot be disabled by a non-administrator | ✓ | ✓ | ✓ | ✓ |
| LANISOLATION WORKS ON VIRTUAL WORKSTATIONS OR SERVERS: These techniques can be used effectively to protect virtualized workstations or virtualized servers. | ✓ | ✓ | ✓ | ✓ |
| MacOS, BSD, router operating systems such as Junipers JunOS, or Cisco IOS | ✓ | ✓ | ✓ | ✓ |
| IoT appliances based on Linux or Linux derivative | ✓ | ✓ | ✓ | ✓ |
| iOS[1] (See note below) | ✗ | ✗ | ✗ | ✗ |
| Android[2] (See note below) | ✗ | ✗ | ✗ | ✗ |

Note 1 and Note 2: Android and iOS typically do not allow Apps to have low level system access necessary to implement network traffic restrictions using host based technologies. This is not necessarily a limitation of the OS, but is a permissions issue that most Apps do not have sufficient low-level system access to implement these things. That said, Apple or Google could easily adapt LanIsolation techniques to iOS or Android if they desired.

FIG. 8 (continued)

Table 1: Host Based Technology Comparison - continued

LanIsolation Notes:

ARP poisoning: On Windows 10, pinging a blocked host results in "request timed out". The poisoned ARP entry is visible in the ARP table on the local machine. However it cannot be deleted unless the user has administrative rights.

Route poisoning: On Windows 10, pinging a blocked host results in "request timed out". The blocked machine does show up in the ARP table, and is discoverable. The poisoned route entries are visible in the routing table. However they cannot be deleted unless the user has administrative rights.

Firewall blocking: On Windows 10, pinging a blocked host results in "General Failure". The blocked machine do show up in the ARP table, and it is discoverable. The firewall rules are visible in the Windows Defender firewall settings, however they cannot be removed unless the user has administrative rights.

Persistence of LanIsolation settings: All three methods can be made to persist across reboots.

Prevention of Lateral movement when a hacker gains administrative rights on a single PC. While it may seem like a limitation of LanIsolation that a hacker could remove settings from a host protected by LanIsolation, even if LanIsolation were removed from a single PC, the hacker will not be able to move laterally within the LAN segment by connecting to other PC's protected by LanIsolation. This however would not prevent the hacker from attempting to traverse the network to accessible servers which were not blocked by LanIsolation, but LanIsolation dramatically reduces the ability of the hacker to move laterally by blocking access to workstations blocked by LanIsolation. Servers can be placed on other network segments protected by firewalls, and other techniques (outside the scope of this document) can be used to prevent pass the hash and other attacks, but those are not within the scope of this patent application.

Dynamically blocking or allowing traffic based on higher level functions such as domain authentication, is possible using Windows Firewall.
Dynamically blocking devices depending on weather or not if a user is authenticated and in-session, or blocking hosts dynamically when the user is logged off or when the Windows session is locked is well within the possibilities of LanIsolation. As an example of this, a user may need and desire access to printers while logged in but may have no valid reason to communicate with printers when their Windows session is locked, or when they are logged off. By integrating LanIsolation techniques, dynamic behavior can easily be achieved. Using a combination of these methods, a much higher level of intra-LAN security can be achieved.

Binary vs. port or application or protocol based filtering: ARP poisoning, and Route poisoning and Null Routing should be considered to be binary On/Off methods to prevent communication between specific hosts on a network. This all or nothing approach is useful in the respect that if two endpoints don't need to communicate, communication can be prevented using either ARP or Route based poisoning. In the event that some traffic may be useful, it is possible to configure Windows Firewall or other firewalls to provide much more sophisticated filtering, thereby allowing specific applications or specific ports or protocols. These things are well understood and extend the concept of LanIsolation to allow partial or limited connectivity using Firewall based rules.

Cisco PVLAN's and other proprietary layer-2 isolation techniques: Important to notice that all of the host-based LanIsolation methods described above do not require implementation of any specialized Ethernet switch, or virtual switch hardware. The aforementioned host-based methods should be compatible with hardware or v-switch based layer-2 isolation techniques made possible by different hardware vendors which could be implemented to add additional layers of security to LanIsolation, but which are not necessary to make LanIsolation work effectively.

References:

OSI Model:
https://msdn.microsoft.com/en-us/windows/ff571073(v=vs.90)

FIG. 8 (continued)

Table 2
Isolated Host visibility to other normally configured hosts on the same network

| LANIsolation Technique | ARP Poisoning | Route Poisoning | Binary Firewall Host Blocking |
|---|---|---|---|
| Isolated Host visibility to other LAN devices: | | | |
| Prevents the isolated host from being able to discover the MAC address of other non-isolated LAN hosts | yes | no | no |
| Prevents the isolated host from being able to ping (using ICMP) other non-isolated LAN hosts | yes | yes | yes |
| Prevents the isolated host from being able to make TCP of UDP connections, or to access files and folders on other non-isolated LAN hosts | yes | yes | yes |
| Non-isolated Host visibility to an isolated host on the same LAN segment: | | | |
| Prevents the isolated host from being able to discover the MAC address of other non-isolated LAN hosts | no | no | no |
| Prevents the isolated host from being able to ping (using ICMP) other non-isolated LAN hosts | yes | yes | yes |
| Prevents the isolated host from being able to make TCP of UDP connections, or to access files and folders on other non-isolated LAN hosts | yes | yes | yes |

Note: The above findings are based on testing with Microsoft Windows 10, other operating systems or operating system versions may have different results.

FIG. 9

Table 3
Isolated Host visibility to other normally configured hosts on other networks

| LANIsolation Technique | ARP Poisoning | Route Poisoning | Binary Firewall Host Blocking |
|---|---|---|---|
| Isolated Host visibility to other devices on other network segments: | | | |
| Prevents the isolated host from being able to discover the MAC address of other non-isolated hosts on other network segments | not applicable | not applicable | not applicable |
| Prevents the isolated host from being able to ping (using ICMP) other non-isolated hosts on other network segments | no | yes | yes |
| Prevents the isolated host from being able to make TCP of UDP connections, or to access files and folders on other non-isolated LAN LAN hosts | no | yes | yes |
| Non-isolated Host visibility to an isolated host on the same LAN segment: | | | |
| Prevents the non-isolated host on another network segment from being able to discover the MAC address of an isolated LAN host | not applicable | not applicable | not applicable |
| Prevents the non-isolated host on another network segment from being able to ping (using ICMP) other isolated LAN hosts | no | yes | yes |
| Prevents the non-isolated host on another network segment from being able to make TCP of UDP connections, or to access files and folders on other isolated LAN hosts | no | yes | yes |

Note: The above findings are based on testing with Microsoft Windows 10, other operating systems or operating system versions may have different results.

FIG. 10

Table 4: Reducing Risks by Limiting Intra-LAN Connections Between Hosts

Number of host and shared devices on the network vs number of potential network connections with and without network isolation

| Hosts | Servers and Printers | Possible Connections without LANIsolation | Possible Connections with LANIsolation | Risk reduction percentage |
|---|---|---|---|---|
| 10 | 2 | 132 | 40 | 69.7% |
| 50 | 2 | 2,652 | 200 | 92.5% |
| 100 | 4 | 10,712 | 800 | 92.5% |
| 250 | 10 | 67,340 | 5,000 | 92.6% |
| 500 | 20 | 269,880 | 20,000 | 92.6% |
| 1,000 | 40 | 1,080,560 | 80,000 | 92.6% |
| 2,500 | 100 | 6,757,400 | 500,000 | 92.6% |
| 5,000 | 200 | 27,034,800 | 2,000,000 | 92.6% |
| 10,000 | 400 | 108,149,600 | 8,000,000 | 92.6% |

Using a rule of thumb where there is one shared device for every 25 users, for networks of 50 hosts and above.

FIG. 11

SYSTEMS, METHODS AND APPARATUS FOR LOCAL AREA NETWORK ISOLATION

CROSS-REFERENCE TO RELATED APPLICATION(S)

This application is a Continuation of U.S. application Ser. No. 16/032,924, filed Jul. 18, 2018, which claims priority to U.S. Provisional Application No. 62/531,231 filed Jul. 11, 2017 and entitled "LAN Isolation System and Associated Devices and Methods," which is hereby incorporated by reference in its entirety under 35 U.S.C. § 119(e).

TECHNICAL FIELD

The disclosed technology relates generally to improved network device implementations, and in particular, to the devices, methods, and design principles allowing for the isolation of individual devices on a local area network via several approaches executed alone or in combination, including ARP poisoning, route poisoning and firewall blocking. The disclosed implementations relate to systems, devices and methods of blocking communications within a LAN which utilizes existing components within the operating system to block communications when configured using methods described herein, thereby allowing the blocking technique to be applied to physical or virtual hosts, running mainstream operating systems such as Microsoft Windows, many variants of BSD, Apple OS X (Based on BSD Unix), Linux based operating systems, Android as well as Apple IOS and others.

BACKGROUND

While IPv6 is on the horizon, IPv4 is still the most prevalent, widely deployed networking protocol. It is also focused on mitigating two significant risks to networks by implementing new tools and techniques to make networks more secure from hackers, and from the lateral movement of malware within IPv4 networks, and from risks imposed by the explosion in the number of deployed Internet of Things (IoT) devices which we are now deploying inside our secure networks.

The disclosed systems, methods and devices determine if two devices should or should not communicate, and if they should not communicate, a solution is provided by the technologies described in this document to block those communications at a very low level therefore preventing said devices from communicating. The described technology which is a binary decision; communicate or not communicate, between network devices, and these techniques are not focused on inspecting communications which are allowed but must be inspected or restricted.

There is a need in the art for improved methods, systems, and devices for isolating individual devices on a local area network.

BRIEF SUMMARY

Discussed herein are various devices, systems, and methods relating to a host-based solution for isolating individual devices on a local area network.

With this in mind it is possible to extend the management platform utilized to control these binary decisions to also control traffic via integration with applications running on edge devices through application of one or more rule sets established and enforced by a platform or control application. In various implementations, the system is comprised of filtering rules applied at the endpoint. This is not a network based filtering solution. So it should not be confused with a hardware firewall, or with hardware based network isolation such as Cisco PVLANs. Fundamentally, the system is host-based, meaning that it runs on the endpoints—the hosts themselves.

This software can be an existing firewall or a new application capable of acting as a firewall or capable of blocking connections and/or inspecting traffic. The software would generally disrupt network activity between a host and other hosts on the network at OSI layer 2, layer 3, and above. Generally, this software would operate and be configured in a manner transparent to end users, however other various embodiments could be operated or configured interactively by an administrator. Further it can be imagined that a server able to talk to multiple hosts at one or more locations could be used to control configuration of the software on multiple hosts.

In addition, all of this technology which is controlling peer-to-peer, and peer-to-server, and Internet traffic, can be fully automated. By integrating AI (artificial intelligence) and/or machine learning, this software can be automated in a way that an autonomous response is possible based on knowledge gained from cloud sources, or from information gained by from other sources including but not limited to; intrusion detection systems, network switches, firewalls, and routers.

In one Example, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for isolation of a LAN including a local area network including at least one default gateway, a first host and a second host. The system also includes where the first host and second host are connected to the internet via the default gateway; and a device including a processor configured to execute a series of executable steps on the first host to prevent communications with the second host via rules applied to at least one of: the data link layer, the network layer, the transport layer, the session layer, the presentation layer, or the application layer, where the series of executed steps includes the establishment and enforcement of at least one endpoint rule selected from the group including of: ARP poisoning, route poisoning and null routing. Other embodiments of this aspect include corresponding computer systems, apparatus, and computer programs recorded on one or more computer storage devices, each configured to perform the actions of the methods.

Implementations may include one or more of the following features. The system where the device processor is configured to enforce firewall rules on the first host. The system where the platform is executed on the first host. The system where the platform is executed on a cloud server. The system where the platform is constructed and arranged to whitelist and blacklist network devices. The system where the platform is configured to establish and enforce additional endpoint rules preventing communications with the blacklisted network devices. The system where the platform is configured to whitelist a default gateway. The system where the device processor is configured to execute: a series of steps on the second host to prevent communications with the first host via rules applied to at least one of: the data link layer, the network layer, the transport layer, the session layer, the presentation layer, or the application layer, where the series of executed steps includes the establishment and enforcement of at least one endpoint rule selected from the group including of ARP poisoning, route poisoning and null routing. The system where the device processor is configured to enforce firewall rules on the second host. Implementations of the described techniques may include hardware, a method or process, or computer software on a computer-accessible medium.

Another Example includes a local area network host isolation system including a local area network including at least one default gateway. The local area network host isolation system also includes a first host. The local area network host isolation system also includes a second host. The local area network host isolation system also includes where the first host and second host are connected to the internet via the default gateway. The local area network host isolation system also includes a processor, the processor constructed and arranged or otherwise configured for executing a platform configured to establish and enforce rules on the first and second hosts in the local area network to prevent peer-to-peer communications within the local area network by implementing at least one of ARP poisoning or route poisoning on the first or second host. Other embodiments of this aspect include corresponding computer systems, apparatus, and computer programs recorded on one or more computer storage devices, each configured to perform the actions of the methods.

Implementations may include one or more of the following features. The system where the platform is constructed and arranged for establishing and enforcing firewall rules on local area network hosts to prevent peer-to-peer communications between the hosts. The system where the platform is constructed and arranged to whitelist and blacklist devices. The system where the platform is configured to whitelist the default gateway and blacklist the first and second hosts. The system where the platform is configured to establish and enforce rules applied to at least one of the data link layer, the network layer, the transport layer, the session layer, the presentation layer, or the application layer on the first or second host. Implementations of the described techniques may include hardware, a method or process, or computer software on a computer-accessible medium.

Another Example relates to a method of isolating hosts on a local area network including: executing a host- or cloud-based platform, where the platform is configured to establish and enforce rules on the hosts to prevent peer-to-peer communications within the local area network by implementing at least one of ARP poisoning rules or route poisoning rules, and optionally a set of firewall rules.

Other embodiments of this aspect include corresponding computer systems, apparatus, and computer programs recorded on one or more computer storage devices, each configured to perform the actions of the methods.

The isolation system in certain implementations can limit peer-to-peer traffic to a host using the isolation system in certain implementations techniques within a normal Ethernet LAN segment which uses IPv4. The isolation system in certain implementations uses host-based technology which does not depend on networking hardware or adaptation of the network architecture. These filtering methods block the ability of malware to exploit zero-day vulnerabilities, because they eliminate the ability for devices (computers) to communicate within the LAN and prevent the proliferation of malware. Even when zero-day attack vectors would normally allow malware to spread rapidly across a shared LAN segment, the isolation system in certain implementations can make it impossible.

The isolation system in certain implementations can limit peer-to-peer traffic to a host within a LAN segment using host-based technology which does not depend on networking hardware or adaptation of the network architecture. These filtering methods block the ability of a hacker to move laterally within a network segment to a host protected by the isolation system in certain implementations from a host which is blocked using The isolation system in certain implementations techniques. Lateral movement within a network can be blocked at a low level, making it impossible for a hacker to move between computers on a protected LAN segment, because the isolation system in certain implementations eliminates the ability of computers to communicate within the LAN.

The isolation system in certain implementations can limit peer-to-peer traffic to a host using the isolation system in certain implementations utilizes techniques within a normal Ethernet LAN segment which uses IPv4. The isolation system in certain implementations uses host-based technology which does not depend on networking hardware or adaptation of the network architecture. While blocking peer-to-peer traffic, these methods, are effective at limiting traffic on the network. One critically important aspect of all three methods is that the do not break the fundamental network discovery mechanisms of Ethernet with respect to ARP. More specifically, when hosts are isolated using any or all of the three described methods, this does not prevent these hosts from participating in ARP discovery. This is necessary to prevent multiple devices from using the same IP address and is also necessary for Ethernet switches to determine the location of endpoints which populate the switches CAM table based on monitoring ARP.

The isolation system in certain implementations is easily understood in the context of a network with static IP addresses, however it can also work in conjunction with DHCP, where a software agent running on a machine to be isolated can securely connect to a server and where the server can communicate a mapping of assigned IP addresses to hostnames. Based on the mapping information the client agent, running with system level permissions can dynamically adjust the isolation system in certain implementations settings to add, remove or modify settings to affect changes as necessary.

The isolation system in certain implementations can be configured to work with cloud based management servers, thereby allowing client computers to dynamically adjust to configuration settings as defined by a network administrator.

The isolation system in certain implementations can provide protection to a host on a shared LAN segment from attack from other hosts by blocking traffic to/from undesired hosts.

The isolation system in certain implementations can provide protection to a host on a shared LAN segment from attack from other hosts by blocking traffic to/from undesired hosts even if the blocked host is on another network segment or on the Internet.

The isolation system in certain implementations can provide protection to a host on a shared LAN segment from attack from other hosts by blocking unnecessary ports, applications or specific users.

Prevention of Lateral movement when a hacker gains administrative rights on a single PC. While it may seem like a limitation of the isolation system that a hacker could remove settings from a host protected by the isolation system in certain implementations, even if the isolation were removed from a single PC, the hacker will not be able to move laterally within the LAN segment by connecting to other PC's protected by the isolation system in certain implementations. This however would not prevent the hacker from attempting to traverse the network to accessible servers which were not blocked by the isolation system in certain implementations, it dramatically reduces the ability of the hacker to move laterally by blocking access to workstations blocked by the isolation system in certain implementations. Servers can be placed on other network segments protected by firewalls, and other techniques (outside the scope of this document) can be used to prevent pass the hash and other attacks, but those are not within the scope of this patent application.

Dynamically blocking or allowing traffic based on higher level functions such as domain authentication, is possible using Windows Firewall.

Dynamically blocking devices depending on whether or not if a user is authenticated and in-session, or blocking hosts dynamically when the user is logged off or when the Windows session is locked is well within the possibilities of the isolation system in certain implementations. As an example of this, a user may need and desire access to printers while logged in but may have no valid reason to communicate with printers when their Windows session is locked, or when they are logged off. By integrating the isolation system techniques, dynamic behavior can easily be achieved. Using a combination of these methods, a much higher level of intra-LAN security can be achieved.

In certain implementations of the isolation system, ARP poisoning, route poisoning and null routing should be considered to be binary (on/off) methods to prevent communication between specific hosts on a network. These all-or-nothing approaches are useful in the respect that if two endpoints do not need to communicate, communication can be prevented using either ARP or Route based poisoning. In the event that some traffic may be useful, it is possible to configure Windows Firewall or other firewalls to provide much more sophisticated filtering, thereby allowing specific applications or specific ports or protocols. These things are well understood and extend the concept of the isolation system in certain implementations to allow partial or limited connectivity using Firewall based rules.

Cisco PVLAN's and other proprietary layer-2 isolation techniques: Important to notice that all of the host-based The isolation system in certain implementations methods described above do not require implementation of any specialized Ethernet switch, or virtual switch hardware. The aforementioned host-based methods should be compatible with hardware or v-switch based layer-2 isolation techniques made possible by different hardware vendors which could be implemented to add additional layers of security to the isolation system in certain implementations, but which are not necessary to make the isolation system in certain implementations work effectively.

While multiple embodiments are disclosed, still other embodiments of the disclosure will become apparent to those skilled in the art from the following detailed description, which shows and describes illustrative embodiments of the disclosed apparatus, systems, and methods. As will be realized, the disclosed apparatus, systems, and methods are capable of modifications in various obvious aspects, all without departing from the spirit and scope of the disclosure. Accordingly, the drawings and detailed description are to be regarded as illustrative in nature and not restrictive.

BRIEF DESCRIPTION OF THE DRAWINGS

FIG. 5D-1 depicts a poisoned route, according to one implementation.

FIG. 5D-2 depicts a poisoned route, according to another implementation.

FIG. 8 shows Table 1: Host Based Technology Comparison.

FIG. 9 shows Table 2: Isolated Host visibility to other normally configured hosts on the same network.

FIG. 10 shows Table 3: Isolated Host visibility to other normally configured hosts on other networks.

FIG. 11 shows Table 4: Reducing Risks by Limiting Intra-LAN Connections Between Hosts.

DETAILED DESCRIPTION

Figure 1A:
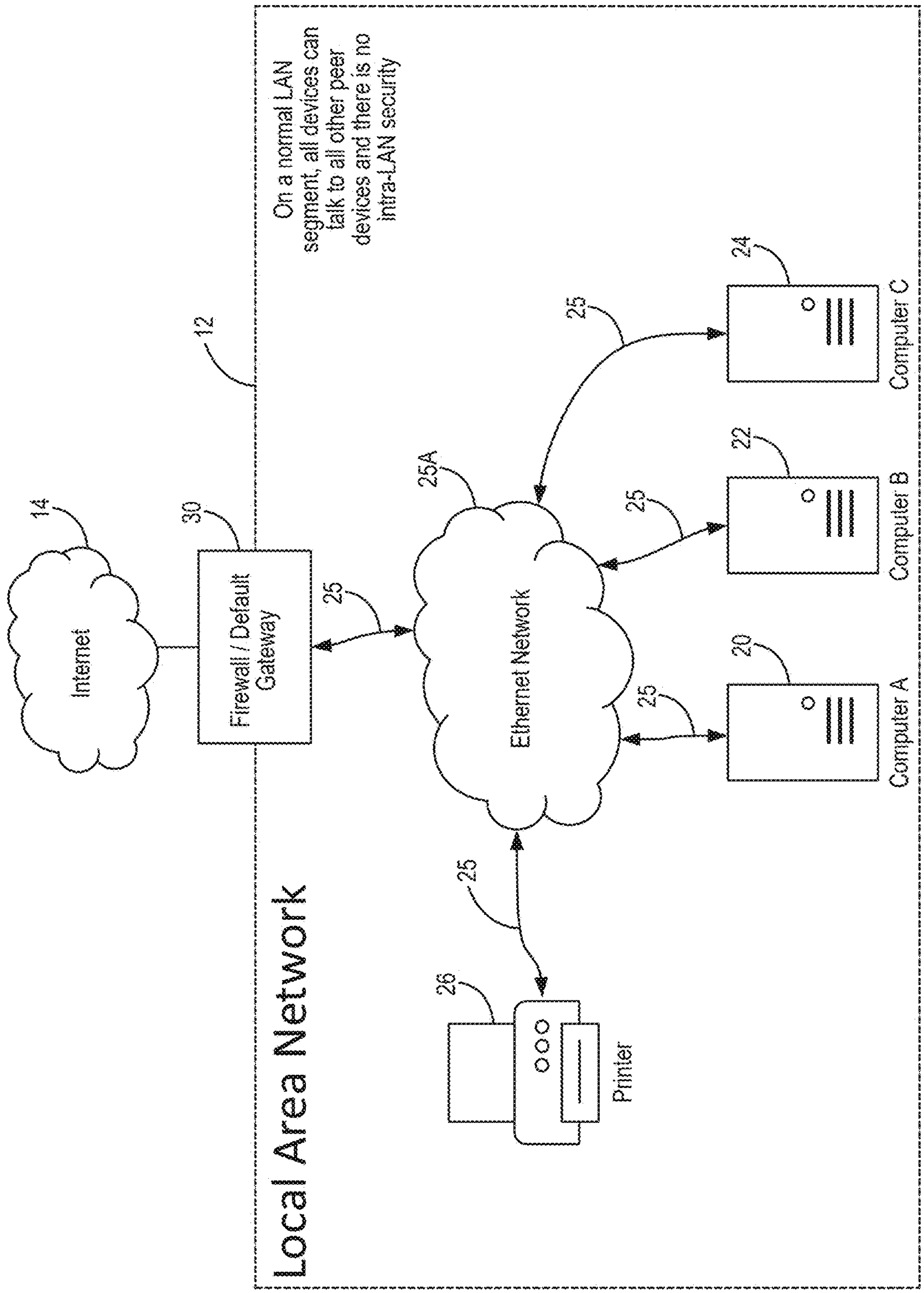
FIG. 1A is a schematic of a prior art local area network.

The various embodiments disclosed or contemplated herein relate to a LAN isolation system 10. Fundamentally, intra-network security is a byproduct of each individual host's security. That is, various implementations of the system relate to technologies and design principles constructed and arranged to rendering a networked device incapable of communicating to the other hosts on the network. By utilizing these endpoint-based implementations, the overall network security is thus improved.

Accordingly, in exemplary implementations, the disclosed isolation system 10 relates to a host-based application, particularly an application of a rules set via a platform 110 communicating with the host. This isolation system and platform 110 thereby isolates or otherwise quarters off individual devices on a local area network.

It is understood that in the various aspects the system platform 110 executes a series of steps related to the establishment of rules on the host or hosts within the network which prevent unnecessary communication between the hosts. In various implementations, these steps are related to one or more of ARP, route and/or null poisoning and firewall rules implemented to prevent endpoint communications at several device and network layers.

In use these rules can be performed by a designated user/administrator, or that a processor may execute an application that results in the determination of the valid host space and establishes the parameters of the poisoning, as would be understood. This is, in various implementations, these rules can be established by the administrator, by business rules, by algorithm, by artificial intelligence and/or a combination of these approaches, as is the case with all references to the establishment of rules and system platform 110 execution steps discussed herein.

It is understood that various implementations provide a system of one or more computers that can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions such as via local probe hardware, desktop, server client, phone app or other software or hardware running software that can be used to implement the isolation system and platform 110 discussed herein.

In exemplary implementations, LAN isolation is achieved by disrupting connections between devices at one or more OSI layers, as is described below. In exemplary implementations, connections at the data link layer, network layer, transport layer, session layer, presentation layer, and application layer can be disrupted and/or prevented, thereby preventing peer-to-peer transmission of malware and associated attacks or viruses. It is understood that these software implemented, endpoint and host-based implementations provide a significant improvement in the operation and function of the underlying devices and networks by providing a novel approach to reducing security threats. Further advantages will be apparent to those of skill in the art.

Turning to the FIGURES in greater detail, in various implementations of the isolation system 10, and as shown generally in FIG. 1A, a local area network ("LAN") 12 is connected to the internet 14. In this exemplary implementation, the LAN 12 normally connects several devices, here a computer 20, another computer 22, a server 24 and a printer 26 are connected with one another and a firewall 30.

Figure 1B:
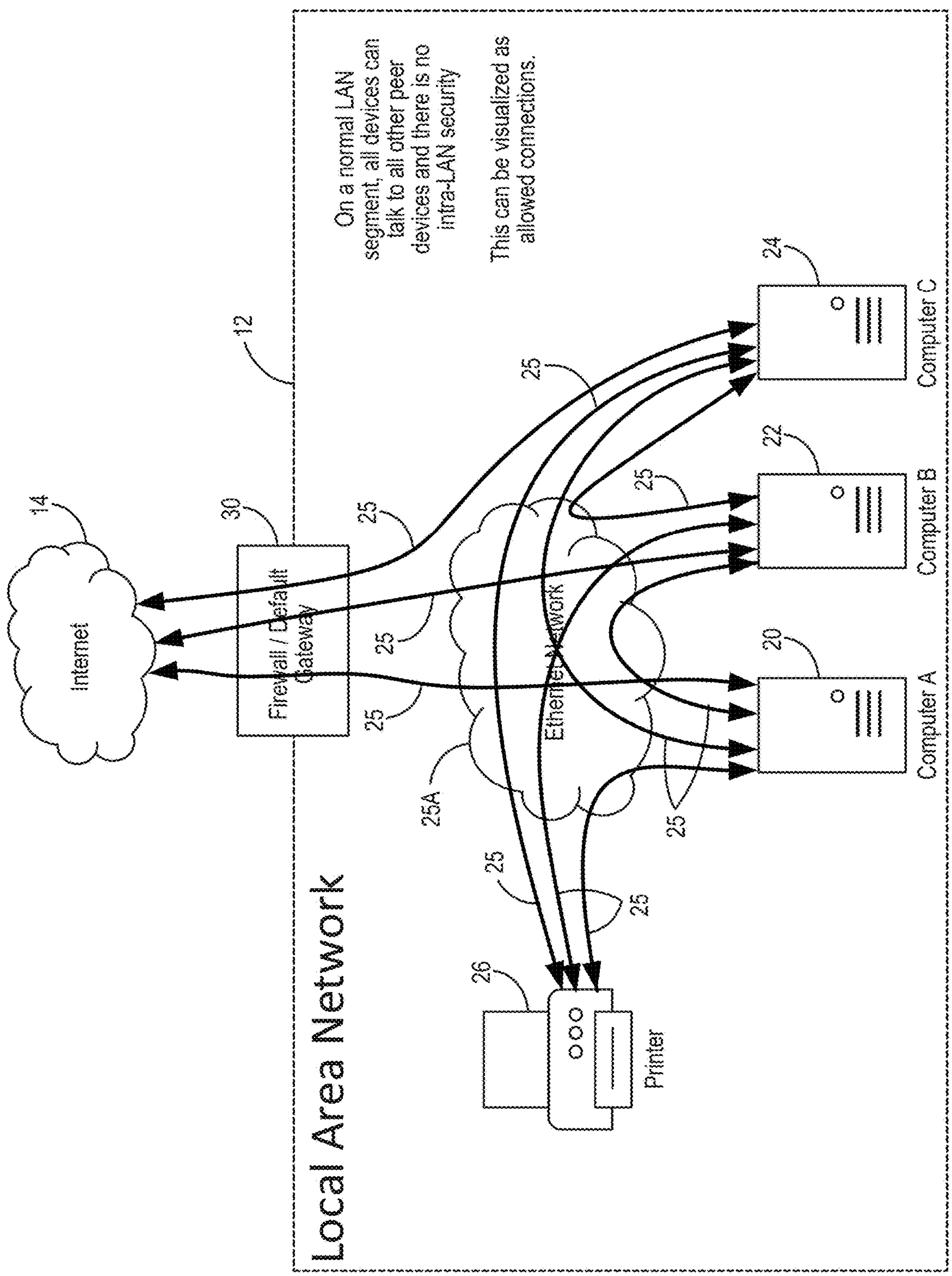
FIG. 1B is a schematic showing the connectivity between the devices on the network of FIG. 1A

As is shown in greater detail in FIG. 1B, it is understood that these connections can be made via many known wired and wireless connections, and that through the operation of the LAN 12, each device 20, 22, 24, 26 is typically able to communicate (shown at active Ethernet connections 25 comprising the Ethernet 25A) with each other device 20, 22, 24, 26 as well as with the internet 14 via the firewall 30.

Figure 1C:
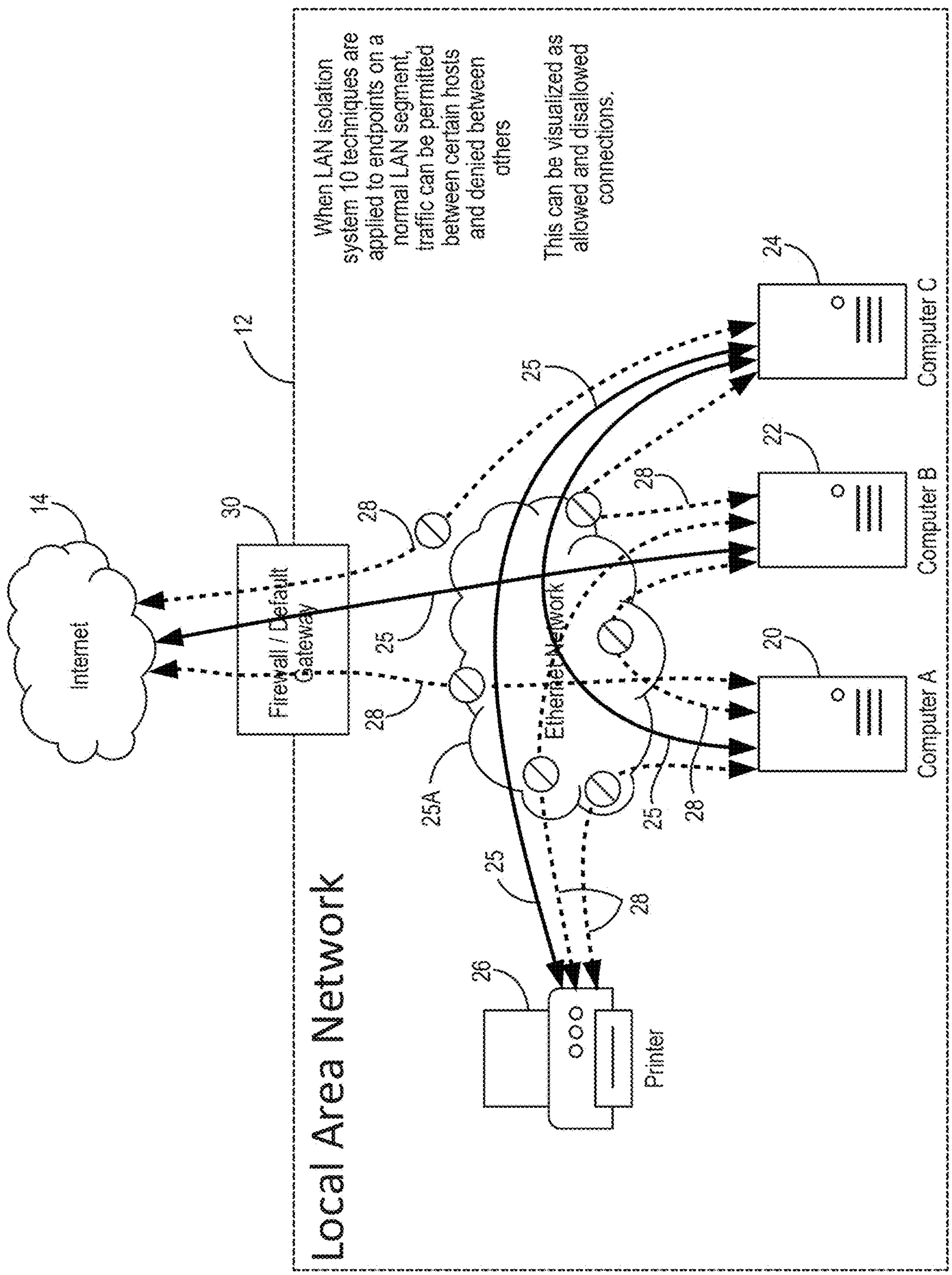
FIG. 1C is a is a schematic showing the disruption of certain connections between the devices on the network of FIGS. 1A and 1B, according to one implementation of the isolation system.

As shown in the implementation of FIG. 1C, various implementations of the isolation system 10 prevent (shown at the disrupted connections 28) LAN-level communications 25 between devices 20, 22, 24, 26 to reduce the spread of intra-LAN or peer-to-peer attacks, such as so-called "zero-day events." The following descriptions and examples can be used to understand the scope and nature of the isolation system 10 applied to created a siloed or isolated Ethernet 25B within the LAN 12.

A. Intra-LAN Security Threats

In traditional networks-such as those utilizing TCP/IPv4-security from external attack is typically based on building a hard perimeter with the firewall 30 or firewalls that denies inbound connections, such that the firewall is providing Network Address Translation ("NAT") and allowing outbound traffic from computers on the LAN 12 to reach the internet 14.

Existing security mechanisms to prevent peer-to-peer traffic within the LAN 10 are rarer, and typically rely on a PC based firewall, which typically allows peer-to-peer traffic for file sharing, ICMP, and management functions. It is understood that these can be achieved with expensive vendor specific technologies such as PVLAN's, port-based isolation, host isolation, and the like. Other expensive, complex, and hard to maintain options include 802.1x for port-based network access control which once a device is authenticated can drop devices into specific VLANs. The limitations to these approaches are evident to those of skill in the art.

It is understood that users of Internet connected computers can unintentionally download malware, viruses, or ransomware and those applications can then traverse the internal network, infecting other computers in seconds or minutes. This rapid proliferation makes networks of all sizes highly vulnerable. When these types of events occur, it can cost companies substantial time, money, and labor to recover, and after systems are recovered, it can be difficult or impossible to be certain that hackers don't still have backdoors to get back into the network a later date.

For example, most businesses rely on LAN segments for users who need to access common servers, printers, and other network resources, but there has been little technology to prevent peer-to-peer traffic within a network segment. When security is needed, administrators typically deploy a separate VLAN (Virtual LAN) segment which allows for example, computers in VLAN-7 to be isolated from VLAN-8. Computers in VLAN-8 can have access to things they need and can be completely isolated from computers in VLAN-7. At the same time, so-called internet-of-things or "IoT" devices are regularly introduced into protected LAN segments, making it difficult or impractical to control traffic by implementing VLAN-based segmentation. One other practicality is that the ability to isolate hosts to prevent lateral network movement becomes difficult at scale because the network would need each host on its own VLAN. For example, 100 PCs would require 100 VLANs to prevent lateral compromise.

Malware can quickly spread within a protected network segment because: 1) Firewall rules on PCs generally assume that we trust other devices on the same network segment; 2) zero-day events can easily exploit unpatched vulnerabilities in systems; 3) traditional antivirus software often cannot detect malware as fast as it spreads, or alternatively hackers can produce malware with unique signatures or stolen security certificates that go undetected; 4) isolating PCs from each other via VLANS is complex and not frequently done; and 5) isolating PCs from each other via PVLANS is a new technique and typically not implemented within business networks because it is expensive and some peer-to-peer communication is necessary. In contrast, the present system 10 differs from PVLANS as it does not rely on a hardware device in the form of an Ethernet switch with PVLAN, which provides layer 2 isolation. Instead, the disclosed system 10 relates to a host-based software solution, which is significantly less costly than addressing the issue via a switch-based method.

Further, software vendors rely on patching networks infrastructure and hosts to prevent vulnerabilities from being exploited and networks becoming compromised. This takes a lot of time, money, and effort to keep up on patches for operating systems, and installed applications. As vulnerabilities are discovered, there is always a gap in time between when the vulnerability is reported to the software vendor, and when they are able to patch the vulnerability, and when companies are able to get the software patch installed on all their systems.

Even further, in some applications such as industrial control systems, PCs are frequently used to control and monitor equipment. Often times companies go out of business and the useful life of the equipment being controlled far exceeds the life of the operating system. For example, Windows XP® is no longer supported by Microsoft®, yet there are thousands of PCs still running in critical applications. As new devices are added to these networks, these antiquated or unsupported/out-of-date PCs are remain vulnerable to network-based attacks. These attacks can render systems unusable in seconds, and patching these systems may not be possible because the operating system is no longer supported by the manufacturer.

Accordingly, it is desirable to isolate various individual devices, but due to the time and complexity of implementing VLANS, devices commonly reside on the same LAN segments as other systems. Currently there are few practical options to secure these systems from attack, and companies commonly rely on network-segmentation using VLAN-based isolation as a strategy to prevent these networks from being attacked. The problem with this strategy is that if malware ever enters these network segments, any old or out-of-date systems are immediately vulnerable.

Where endpoint firewalls are deployed as a primary method of security, those firewalls must function perfectly to prevent unintentional communication and/or security compromises. Securing networks via edge devices has proven to be an ineffective strategy as according to a 2016 SANS Threat Landscape Survey, over 75% of all network breaches originate at the endpoint. When these breaches occur, edge based network security in the form of a firewall becomes ineffective as client computers originate outbound connections, thereby opening the door to an attacker.

B. LAN Isolation

The isolation system 10 differs from prior art methods by employing a binary communication decision and configuring communications so that even unpatched systems are not vulnerable to network attack from systems that should not be attacking them in the first place. Additionally, the system 10 can apply granular firewall rules to modify existing security, but the core goal of the technology is to eliminate peer-to-peer communications altogether where possible.

Accordingly, the various implementations of the disclosed isolation system 10 relate to a mitigating significant risks to LAN networks 12 by implementing new tools and techniques to keep those networks more secure from hackers, and from the lateral movement of malware within IPv4 networks, such as the from risks imposed by the explosion in the number of deployed IoT devices, the use of USB drives and unsecured downloading of files from the internet. These advanced, persistent malware attacks can survive attempts to remove them, such as reboots, hard drive reformatting and the like.

It is understood that under the isolation system 10, managing peer-to-peer connectivity can be enforced via one of several core methods.

Figure 1D:
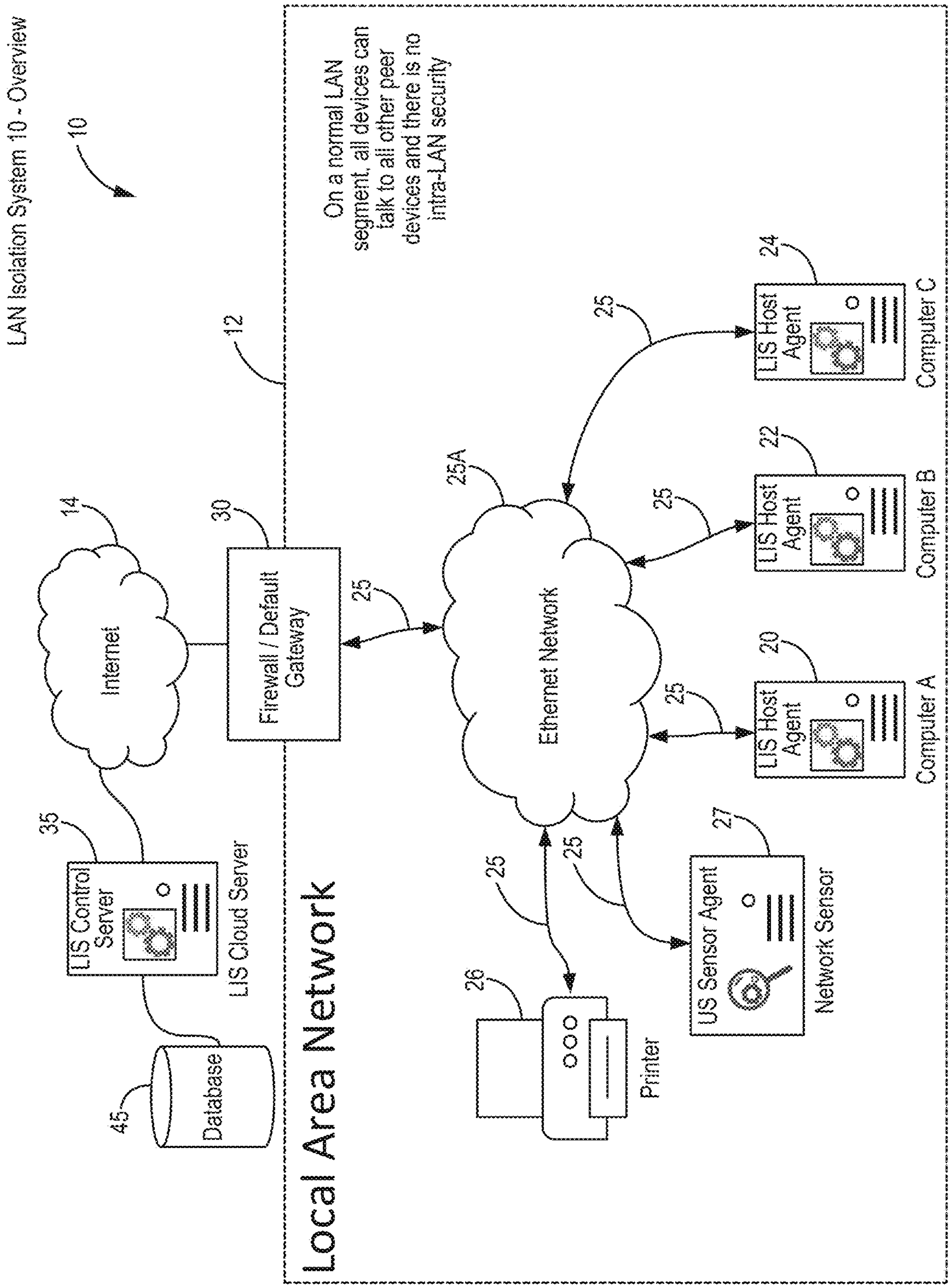
FIG. 1D is a schematic of an exemplary implementation of the isolation system.

As shown in FIG. 1D, the isolation system 10 is executing a platform 110 or application being run on each host machine (on each PC on the network) or device 20, 22, 24, 26. This system 10 is configured to fetch its instructions from: a the system 10 control (management) server 45 on the LAN, or a the system 10 control server in the cloud (on the internet).

There would be another agent running on the LAN server, which would tie-into the DHCP process, so it would maintain a mapping of the hostnames on the network to the IP addresses. This can also be a firewall based agent if the firewall were responsible for DHCP.

Users managing the system would be able to manage the network using common names to machines or printers instead of having to know the IP addresses. The management server (or cloud hosted management service) would then package up instructions for each endpoint on the network, so the endpoint would know which hosts to allow and which hosts to isolate.

Optionally, as shown in the implementation of FIG. 1D, the system 10 as a network sensor 27—or multiple network sensors—that can contribute information, such as that the network is under attack from specific hosts. This information can be sent to the management server where it would be processed. Based on this knowledge, new rules can be generated for each host on the network. Hosts on the network would periodically download these rules and can therefore adapt to changing threats on the network.

The system 10 agent running on each host 20, 22, 24 then periodically fetches the specific configuration from the management server (or cloud hosted management server) and pulls them down. The agent then applies the LAN isolation rules to allow or deny connectivity to/from any host as determined by a network administrator. These rules can be applied based on a number of methods which include but are not limited to: ARP poisoning (discussed below in relation to FIGS. 4A-4D and at 50), route poisoning (discussed below in relation to FIGS. 5A-5D and at 70), null routing (discussed below in relation to FIG. 6 and at 130), and/or via firewall rules (discussed below in relation to FIG. 7 and at 150).

Host based rules would be bundled for each host on the network, and serialized so that when changes occur on the management server, the system 10 agents running on hosts can poll the system 10 cloud server and can detect configuration changes and download updated LAN isolation rules whenever changes occur. Once downloaded the system 10 agent on the host applies the rules, thereby updating the configuration.

Additionally, machine learning and/or artificial intelligence can be applied at multiple points including but not limited to on each individual host, on the network sensor, on the server, on the system 10 cloud control server. By using machine learning the network can dynamically adapt to threats based on a variety of factors.

Figure 2A:
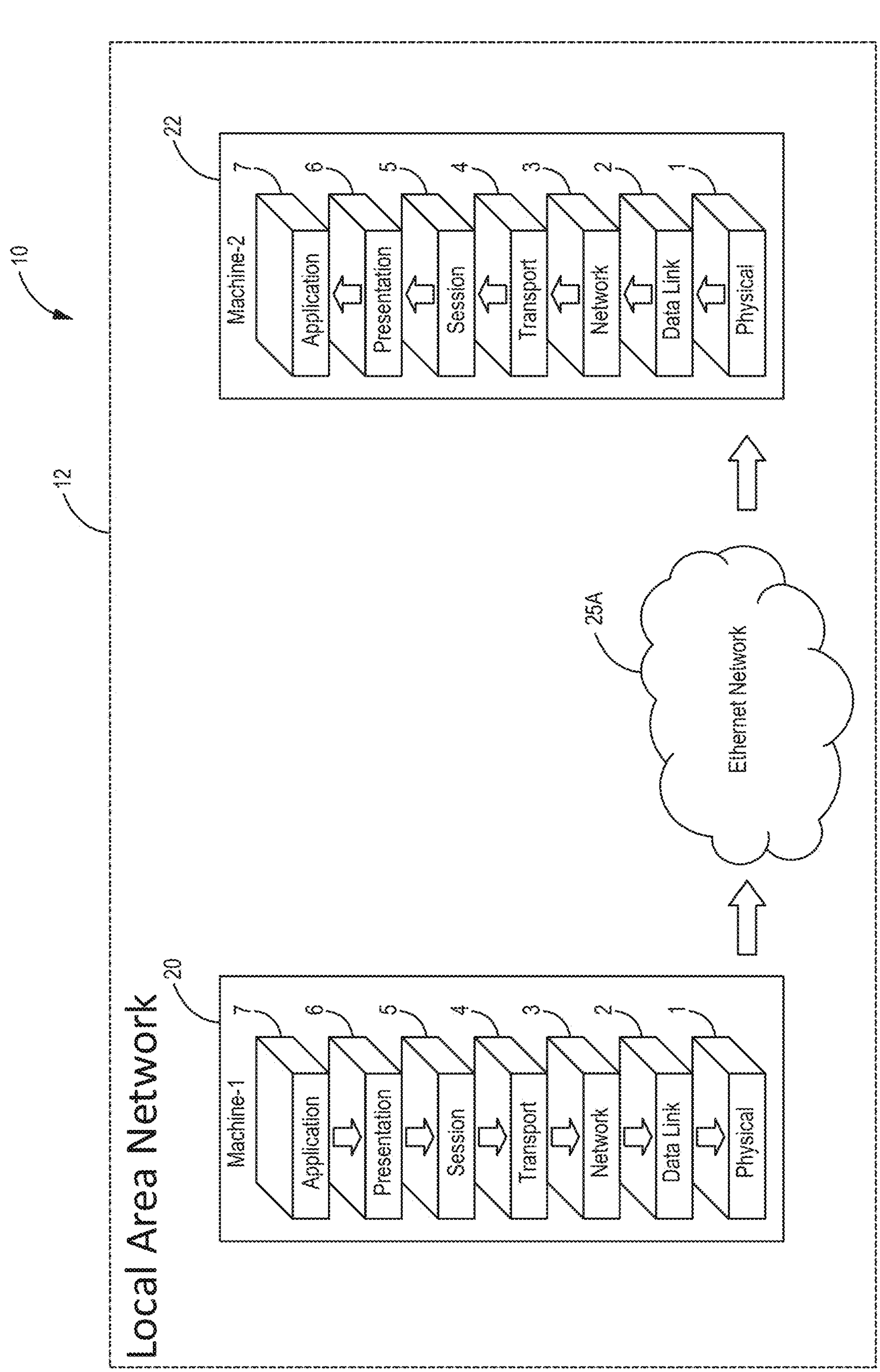
FIG. 2A is a schematic showing the several transportation layers of networked devices on a local area network.
Figure 2B:
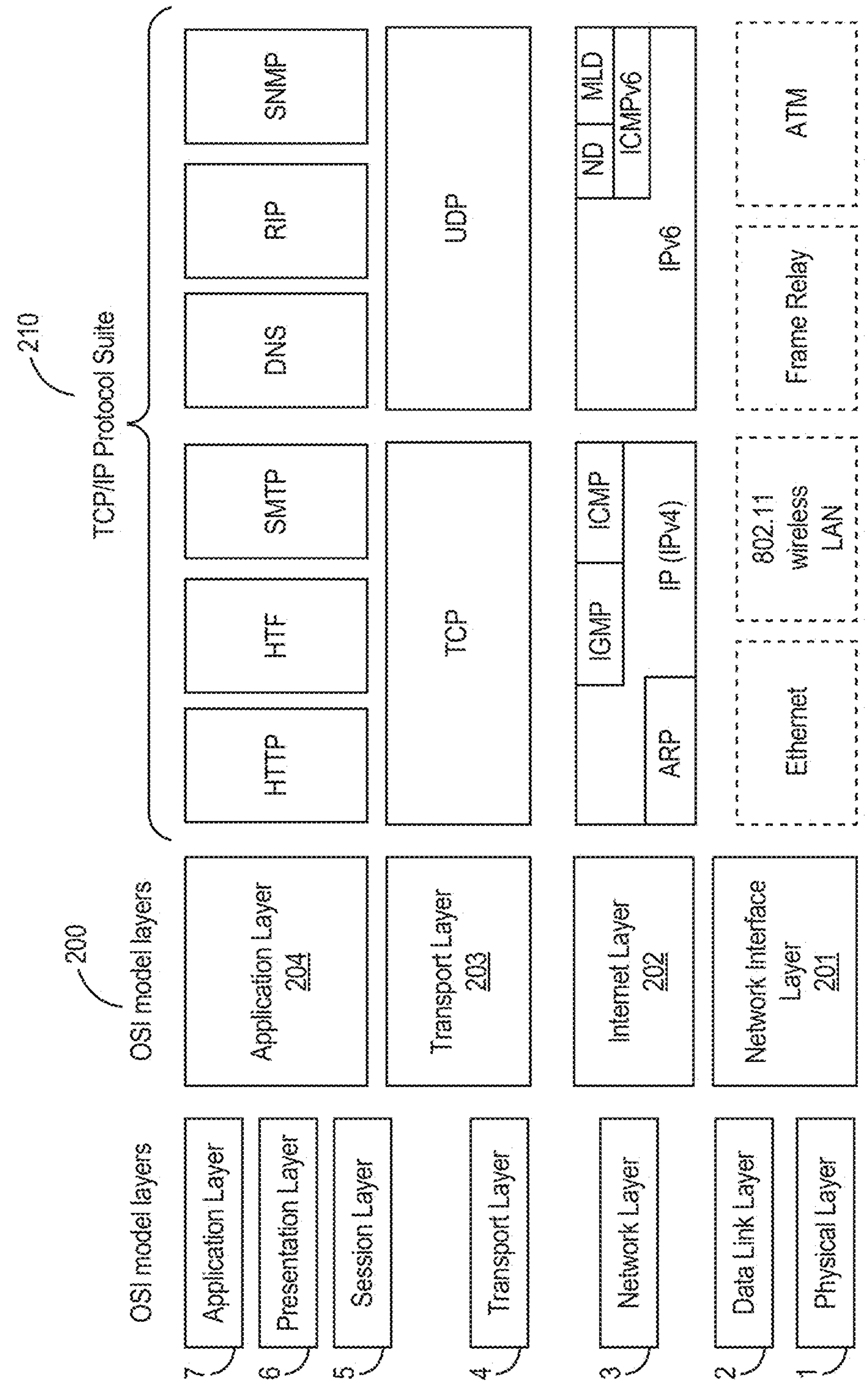
FIG. 2B is a schematic showing the several transportation layers and associated components of a networked device on a local area network.

It is important to understand that these systems utilize the operations and structure of a typical networked device, which can be understood to be operating an OSI reference model comprising several communication layers, as is shown in FIGS. 2A-2B and understood in the art.

Briefly, in these implementations and as shown in FIGS. 2A-2B, an individual device 20, 22 comprises several layers: physical (box/layer 1), data link (layer 2), network (layer 3), transport (layer 4), session (layer 5), presentation (layer 6), and application (layer 7). Communications between the machines 20, 22 are pass through sent through one or more layers and through the Ethernet connection 26, as is understood. For further information, see, for example https://docs.microsoft.com/en-us/Windows®-hardware/drivers/network/Windows®-network-architecture-and-the-osi-model, the teachings of which are incorporated by reference in their entirety. It is further understood, and is shown in FIG. 2B at 200, that DARPA layers 201, 202, 203, 204 can also be used by one of skill in the art.

Figure 2C:
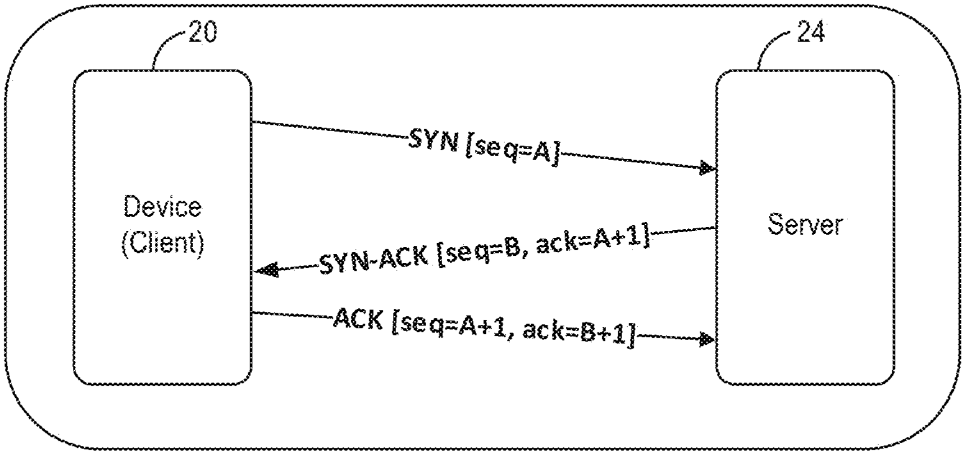
FIG. 2C is a schematic showing the three-way handshake between networked devices on a local area network.

FIG. 2B further depicts the TCP/IP protocol suite 210. FIG. 2C further depicts the typical TCP three-way "handshake."

Under one prior approach, multiple network segments of the network can be isolated at layer-3 or higher via a firewall inspecting traffic between network segments by isolating computers into groups (such as VLANS) and then controlling traffic between groups using firewall or routing rules.

In another prior approach, individual hosts can be isolated from each other at layer-2 while on the same network segment (VLAN) the network can be isolated by using network switches, that is, by implementing on-switch solutions such as PVLANS or proprietary techniques such as switch port access control lists.

In another prior approach, the network can be isolated by using endpoint protection. For example by using on-device firewalls such as Windows® Firewall, on-device application firewalls such as firewalls implemented by Antivirus applications.

In contrast to these cumbersome prior techniques, under the disclosed implementations of the isolation system 10, isolation is achieved by implementing specialized routing rules, by implementing a specialized ARP configuration.

Normally, IP routing is not necessary for devices 20, 22, 24 on the same IPv4 network segment to communicate. Instead, a device 20 resolve the MAC address of the device 22 they desire to communicate with using ARP and communicate directly.

In certain implementations, the system 10 demonstrates how combining several approaches, such as route poisoning (shown in FIG. 3A at box 70) and ARP poisoning (shown in FIG. 3A at box 50 and discussed further below) can be configured on a Windows® based PC to cause communications between two hosts 20, 22 on the same network to be intentionally broken, as shown in FIG. 1C. This system 10 is more sophisticated than null routing, which is commonly used on Linux, BSD and router based operating systems as it combines static routing with ARP poisoning of the gateway assigned to receive the poisoned route.

In recent years the rapid proliferation of viruses, malware and viruses which exploit zero-day vulnerabilities. However, by implementing the system on a LAN 12, a computer 20 running Windows® can be intentionally misconfigured at a low level by the system 10, thereby preventing unnecessary communications within a LAN segment. In alternate implementations, the system 10 can be used on other operating systems if null routing is insufficient to block communications.

In exemplary implementations of the system 10, a host or device 20 can be protected from communicating with any other host or device 22, 24, 26 on the same network 12 or network segment. It is understood that in various implementations, this isolation can be accomplished without modifying other client computers or modifying the network itself, or by modifying the overall network configuration.

In a representative example, the server is a computer a user wishes to communicate to: 192.168.1.2 and the client machine is communicating from 192.168.1.1, and the network mask is a /24 (255.255.255.0) on both hosts.

In use on computers using IPv4, IP routing is accomplished via the computer comparing the local IP address with the IP addresses and network mask of all installed adaptors. If the IP packet is determined to be local (to one of the adaptors), the computer proceeds to do ARP discovery to the broadcast address of the network to discover the MAC address of the target computer. It is understood that the ARP process is well understood by those of skill in the art.

After ARP resolves the MAC address, a three-way handshake is initiated to initiate communications with the target machine. Specifically:

As shown in FIG. 2C, a three-way handshake is the basis for all TCP communications between machines 20, 24 is used to establish a connection between two networked hosts and works as described below:

1. Client sends a TCP packet to the server with the SYN flag set.
2. Server responds to the client request with the SYN and ACK flags set.
3. Client completes the connection by sending a packet with the ACK flag set.

In order for the connection to exist, each side of the connection must send a Synchronize (SYN) flag and receive an Acknowledge (ACK) flag to establish the connection.

What is not widely known is that during the process of determining if the server 24 is on the same network 12 the client 20 actually looks for specific routes to the host and then compares the network mask of the adaptor on the local client computer. This allows a host to have a specific route which overrides the default behavior of a (less specific) network mask.

In the process of determining which hosts are local and which are located on other subnets, the host compares the bound IP address(es) along with their network mask(s) to determine if the host is on the same subnet. If the packet is local, then the aforementioned ARP broadcast followed by a three-way handshake is used to initiate communication.

It is understood that in a /24 network, consisting of the IP range 0.0>0.255, where 0.0 is the network address and 0.255 is the broadcast address, the range of 0.1 through 0.254 are usable host addresses. Similarly CIDR (Classless Interdomain Routing) is well understood and also intentionally not described here. With CIDR different sized networks can be defined.

Figure 3A:
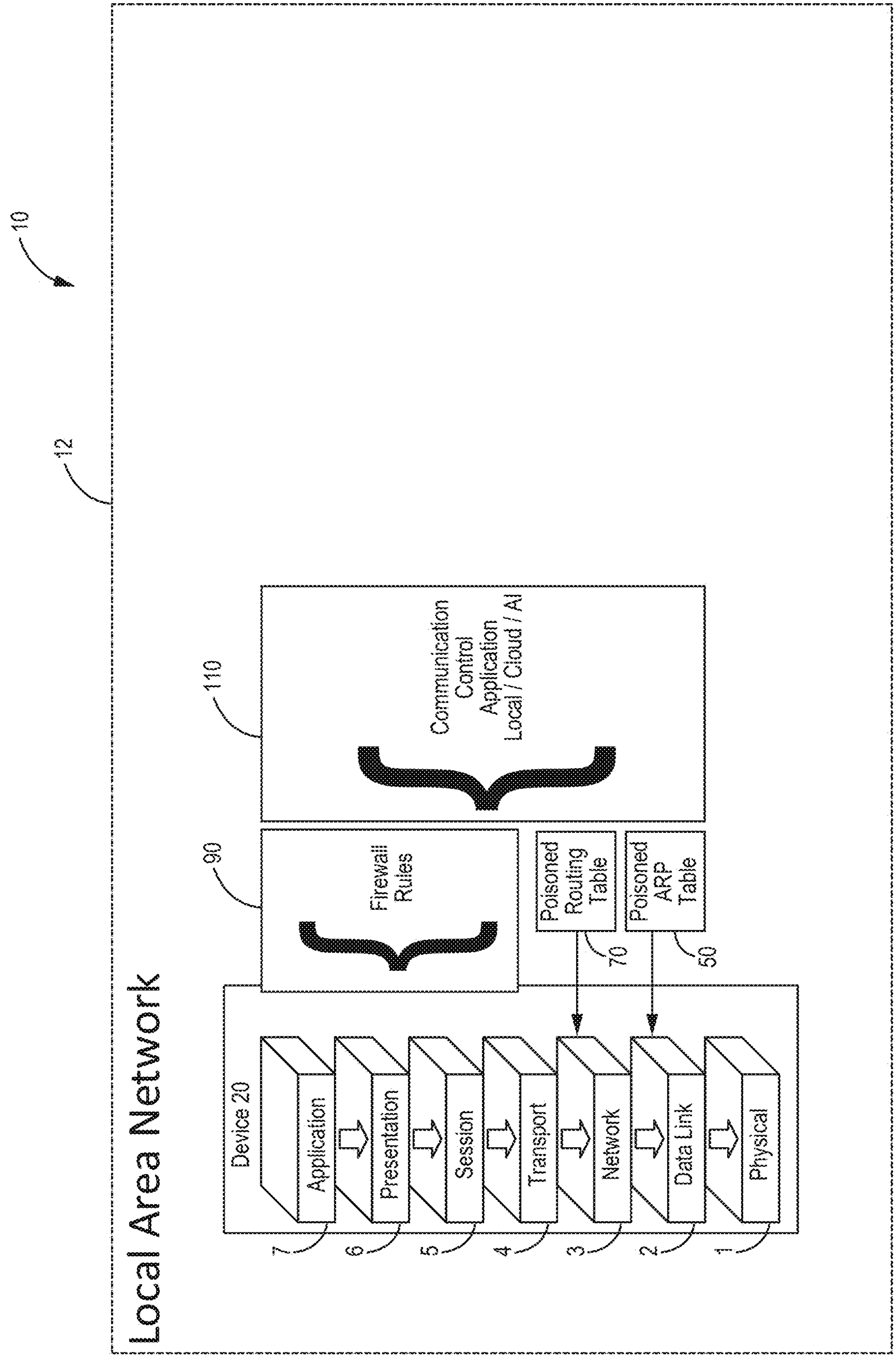
FIG. 3A is a schematic showing the implementations of the communication control platform of the isolation system restricting the operation of a device at several layers, according to one implementation.
Figure 3B:
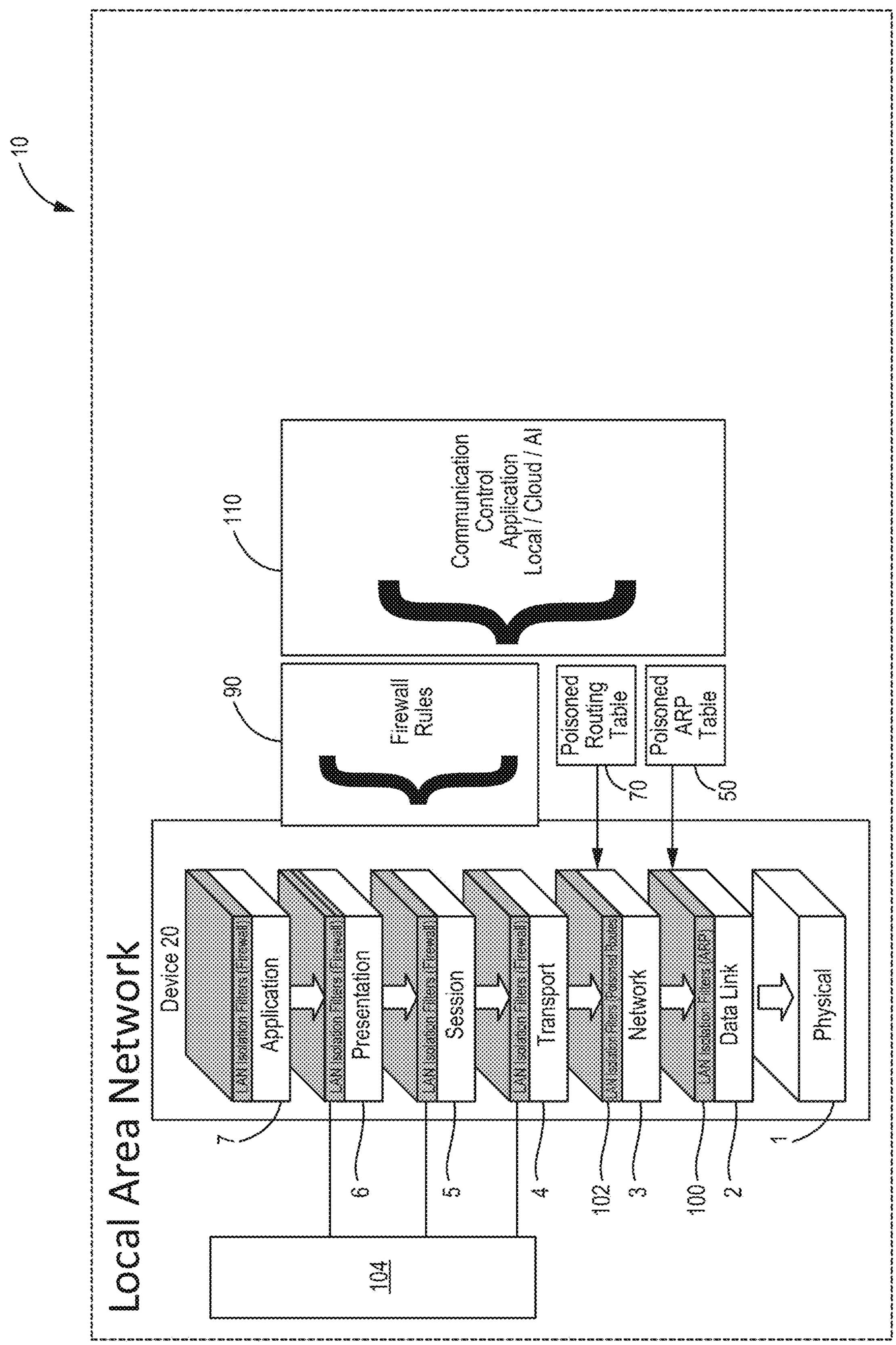
FIG. 3B is a schematic showing the implementations of the communication control platform of the isolation system restricting the operation of a device at several layers, according to another implementation.

As shown in FIGS. 3A-3B, the disclosed implementations of the system 10 relate to controlling peer-to-peer connectivity within a network segment via a system of techniques that essentially "break" peer-to-peer communications between devices which should not ever need to communicate.

Continuing with the FIGURES, the LAN isolation system 10 of FIGS. 3A-3B is implemented in several different OSI levels with any of these levels being capable by itself of breaking peer-to-peer communication.

In various implementations, the system 10 isolation can occur via: (1) intentionally disrupting layer-2 communication via ARP redirection, which is referred to herein as "ARP poisoning" (box 50); (2) intentionally disrupting layer-2 and/or layer-3 communications or both via route redirection, which is referred to herein as "route poisoning" (box 70) or null routing (as is described below in reference to FIG. 6); and/or intentionally breaking communication via firewall rules (box 90), which is referred to herein as "firewall blocking." It is understood that these isolations and controls 50, 70, 90 can be implemented via a host-based communication control application 110, the application 110 being executed locally and controlled locally, via the cloud, on the server or some combination thereof. The application 110 according to some implementations executing one or more algorithms on computer-readable media via a processor, as is understood, and in certain implementations engaging in machine learning, artificial intelligence processes. Machine learning techniques can be applied to analyze traffic to find anomalous behavior or traffic on the network. AI can learn what's good and bad traffic or what the baseline of a network looks like. In further implementations, bulk data can be analyzed to provide insights and remediation automation.

Various implementations have a host sensor (or array of sensors) (software or hardware appliance) that can inspect traffic, detect, and react to "vote a device off of the island." That is to say more specifically to configure other machines on the network in an otherwise automated method to disavow the compromised or assumed-to-be such machine. This will disable or break communications on the LAN segment between a regular host and the potentially infected host. Tables 1, 2 and 3 depict further aspects of certain disclosed implementations of the system 10.

Table 4 illustrates the risk reduction achieved through implementation of the isolation system 10. Briefly, when looking at the mathematics of the number of possible connections on a network where peer to peer traffic is not restricted by the system. The number of potential connections between hosts and shared devices, when considering that any host or shared device can connect to any other host or shared device, can be defined as:

Number of Possible Connections without the System:

$$\text{Hosts+Shared Devices=Total Devices}(TD)$$

$$\text{Number of possible connections}=(TD\times(TD-1))$$

Where TD is the number of total devices on the network. If we have a Network of 100 Hosts:

$$100\times(100-1)=9{,}900 \text{ possible connections}$$

Number of Possible Connections with the System:

$$\text{Number of possible connections}=2\times(\text{Hosts}\times\text{Shared Devices})$$

If we have a Network of 96 Hosts and 4 Shared Devices:

$$2\times(96\times4)=768 \text{ possible connections}$$

Mitigating Risk by Blocking Connectivity while Locked or Logged Out:

Risk can be further mitigated by disabling connections to printers and normal file servers when employees are not logged into their workstation. When users are logged off or while their workstation is locked, all network connections are blocked to all endpoints other than specified management servers.

These implementations can be understood as eliminating most connectivity for most endpoints while the user is not logged in. The exact reduction is based on the number of logged on hours per year. For example, if an employee worked 1,912 hours per year and was logged in for all of that time, the reduction in risk would be a further reduction in risk of roughly 78.2% over the risk percentages identified above.

As is also shown in FIG. 3B, various implementations implement layer-level filters 100, 102, 104 at various discrete OSI layers. That is, an ARP filter 102 is functionally created at layer 2, a route filter 102 is created in layer 3, and firewall filters 104 are implemented at layers 4-7. It is understood that these filters 100, 102, 104 can be configured in such a way to only allow desired connectivity and application of business or operational rules to block or allow communication between hosts. It is further understood that all of the disclosed approaches can be made to persist across reboots in various implementations.

By intentionally breaking communications between devices on the network, the system 10 according to various implementations can provide a number of security benefits including but not limited to preventing: (1) the rapid spread of malware via peer-to-peer attack vectors such that if one PC gets infected it literally cannot infect other PCs; (2) a remote command and control function IoT device from gaining access to servers or workstations within our a protected network; (3) other users on a protected network from snooping or connecting to PCs they should not be connecting to, such that a user on the network cannot use administrative shares and domain credentials to browse files on a workstation they should not be accessing; and/or (4) successful ARP redirection attacks within local network segments and we can notify users and/or network administrators if ARP redirection is suspected or observed. Other benefits will be apparent to those of skill in the art.

I. ARP Poisoning

In various operating systems using IPv4, such as Windows® 10, pinging a blocked host results in a timed out request timed. The poisoned ARP entry is visible in the ARP table on the local machine. However, the poisoned entry cannot be deleted unless the user has administrative rights. It is understood that ARP poisoning will work within any LAN or network segment, but will not extend outside the LAN/network segment, thereby making it optimally suited for preventing peer-to-peer connections.

Figure 4A:
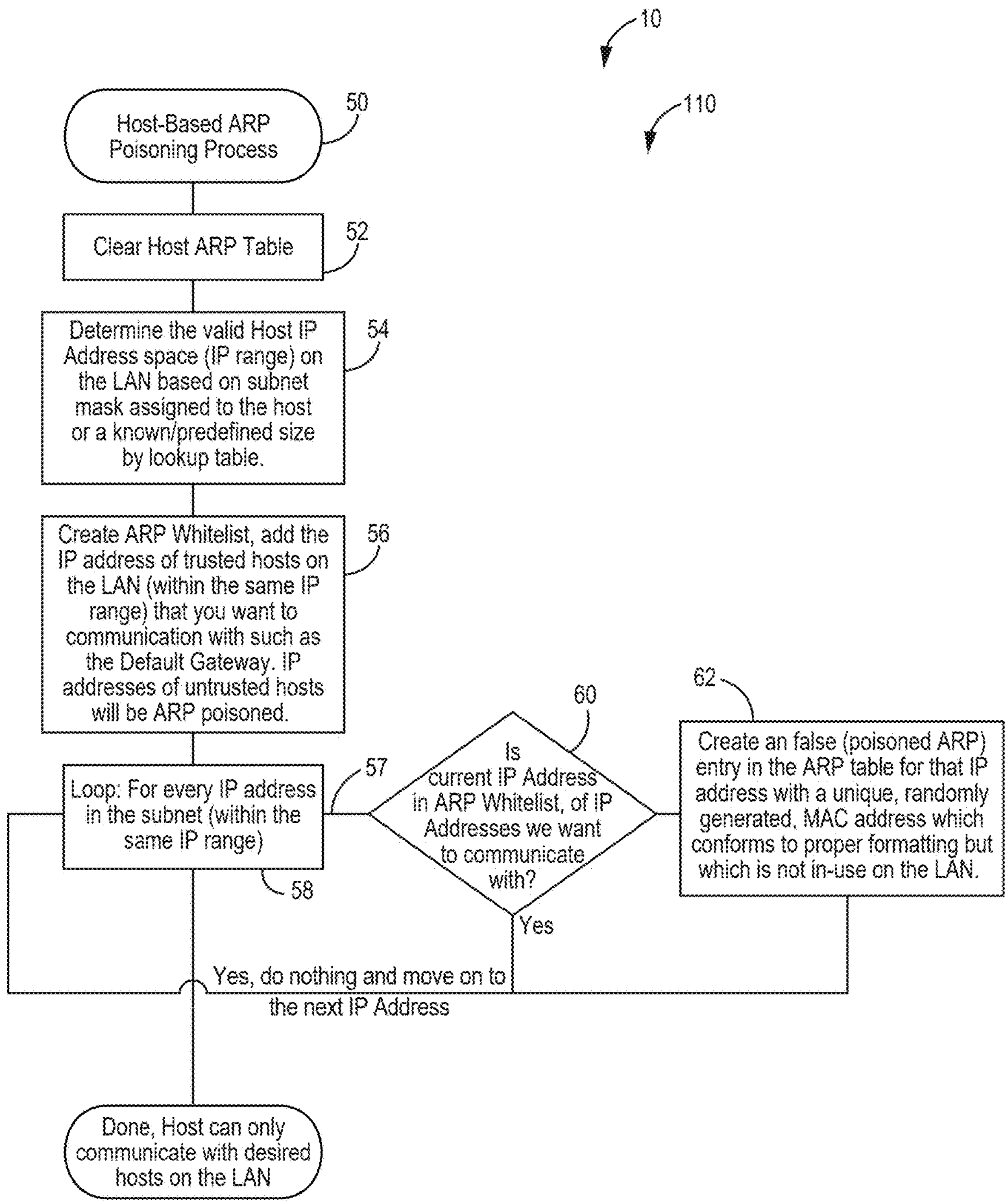
FIG. 4A is a flow chart showing the system 10 executing an ARP poisoning process via the platform, according to one implementation.

FIG. 4A depicts an exemplary implementation of a host-based ARP poisoning process 50. In this implementation, several steps are executed, which can be performed by a user and/or administrator, or executed via a host-based processor and control platform 110 or application running on the host, LAN and/or cloud (as is shown in FIG. 1D at 20, 24 and 35/45). It is understood that the described steps may be performed in alternate orders, or based on other network or host conditions, and that in alternate implementations some steps may be omitted.

Figure 4B:
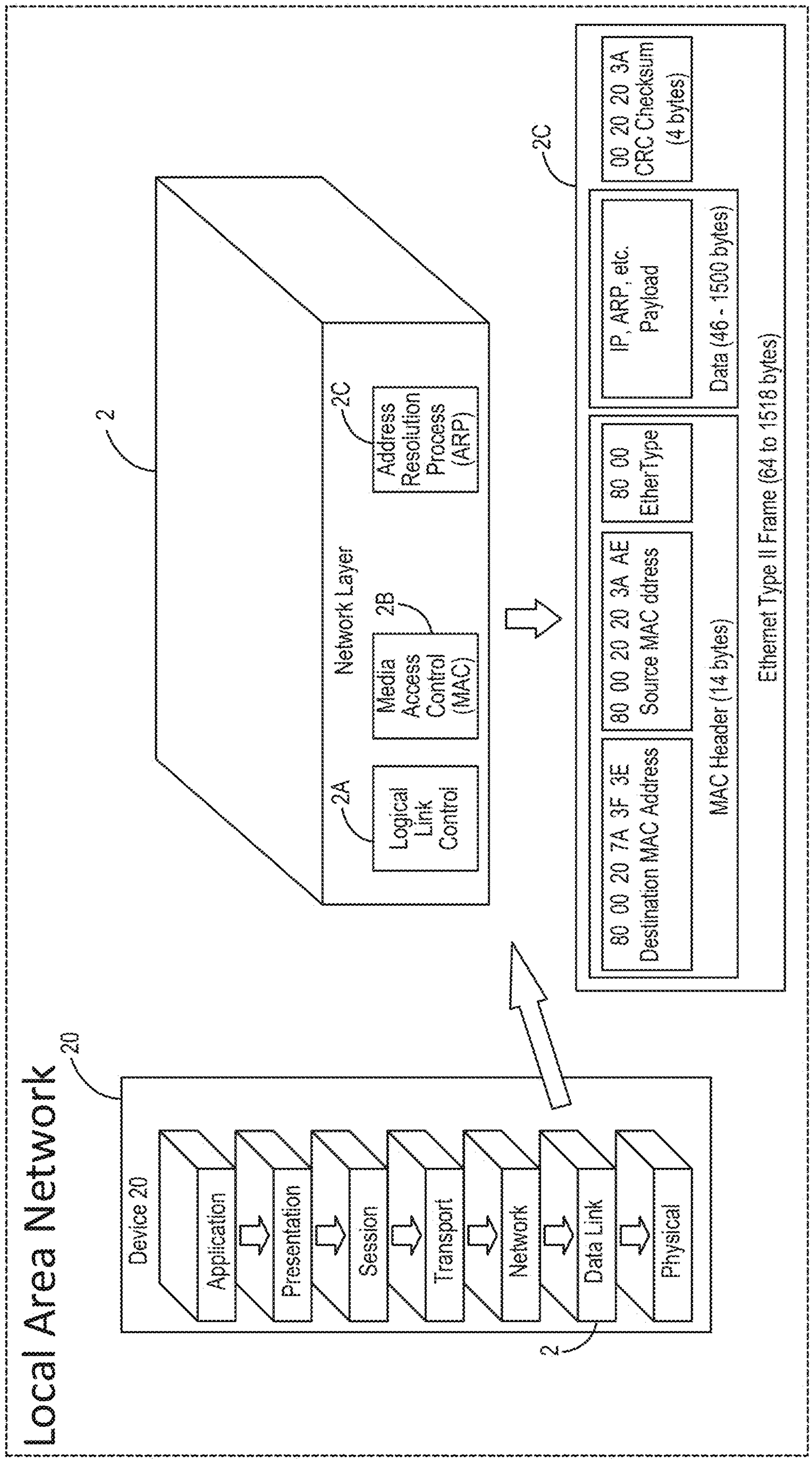
FIG. 4B is an up-close schematic of the data link layer, according to one implementation.

FIG. 4B depicts a schematic view of the data link layer 2, having a logical link control 2A, a media access control (MAC) 2B, an address resolution process (ARP) 2C and Ethernet frame 2D, amongst other features understood in the art.

Figure 4C:
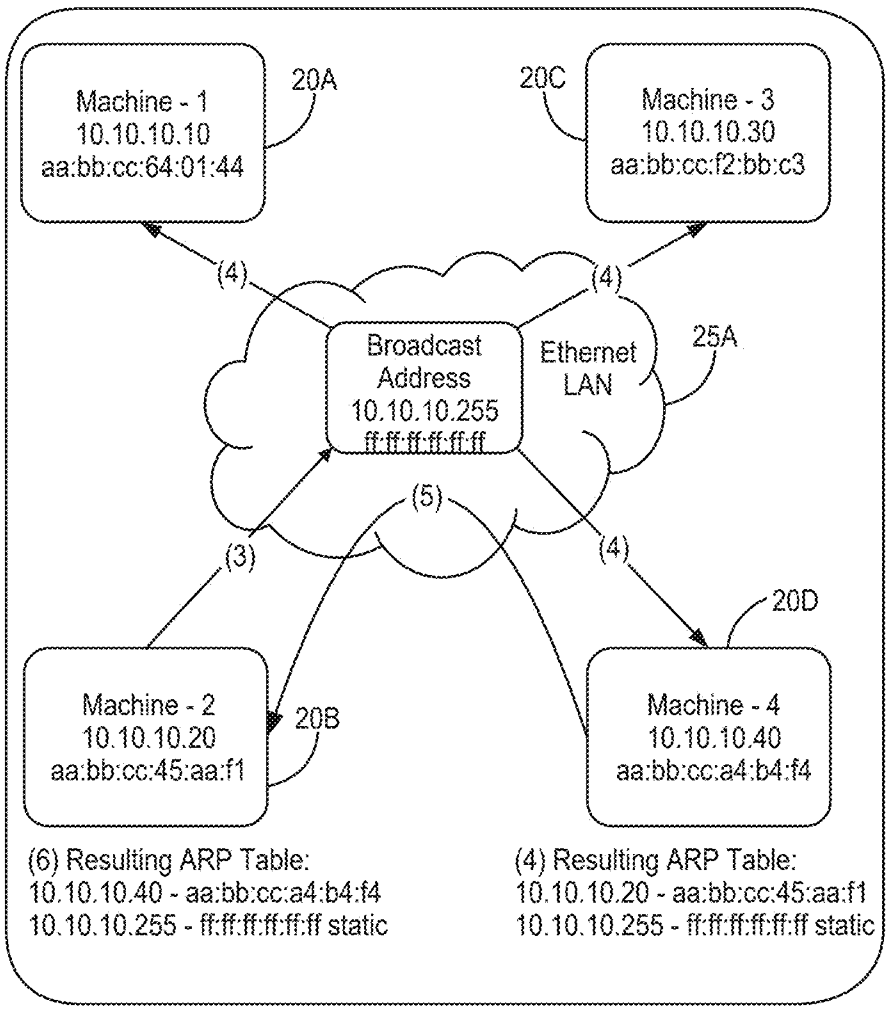
FIG. 4C is a cartoon schematic of a typical ARP broadcast process on a local area network.

FIG. 4C depicts a normal ARP broadcast procedure 300. In this example, several devices 20A, 20B, 20C, 20D (also labeled Machine-1, Machine-2, Machine-3 and Machine-4) are connected on a network 12.

In this implementation, Machine-2 has packets it desires to send to 10.10.10.40 (Machine-4). Accordingly, Machine-2 initiates a communication procedure with Machine-4. Briefly, Machine-2, queries in the local ARP table (cache) and determines that it does not know the MAC address for 10.10.10.40. Machine-2, then examines the subnet mask: 255.255.255.0, and determines the broadcast address is 10.10.10.255. Next, Machine-2 creates an ARP request for the MAC address for 10.10.10.40. This request is sent to the broadcast address for the network (10.10.10.255). This is done by sending the packet to: ff:ff:ff:ff:ff:ff. All machines on the network hear this request. The switch floods (sends) this request to all hosts on the network. All machines receive and ignore the request other than Machine-4 who determines that it has the IP address requested. The Machine-4 ARP Table is updated to contain the MAC address of Machine-2:10.10.10.20—aa:bb:cc:45:aa:f1

Next, Machine-2 then replies with its MAC address by sending a response to 10.10.10.20—aa:bb:cc:45:aa:f1. When the ARP response is received by 10.10.10.20, it updates its ARP Table (cache): 10.10.10.40—aa:bb:cc:a4:b4:f4

Importantly, these implementations SWITCH CAM Table(s). That is, in this process, the Ethernet switches on the network also learn the MAC addresses of endpoints connected to their interfaces. This information is stored in the CAM (Content Addressable Memory) table. When packets are received for devices where the port is unknown, the switch floods (sends) the packet for the unknown hosts to all switch ports. During the ARP process the switch learns the port location for all hosts.

In the ARP poisoning 50 implementation of FIG. 4A, an individual device is isolated from the LAN as follows. As an initial step, the device's host ARP table is cleared (box 52). It is understood that the host ARP table can be cleared by a user/administrator, or that a processor may execute an application that results in the clearance.

In another step, the system 10 determines the valid host IP address space on the LAN (box 54). In various implementations, this can be done via the subnet mask assigned to the host or a known/predefined size by lookup table. It is understood that this can also be performed by a user/administrator, or that a processor may execute an application that results in the determination of the valid host space and establishes the parameters of the poisoning, as would be understood. This is, in various implementations, these rules can be established by the administrator, by business rules, by algorithm, by artificial intelligence and/or a combination of these approaches, as is the case with all references to the establishment of rules discussed herein.

In another step, required communication or "white listed" devices are established (box 56), that is, the system 10 establishes and/or identifies other hosts that the subject device 20 should continue to communicate with, such as the default gateway and/or a networked printer (shown in FIG. 1 at 30 and 26, respectively). It is understood that these established required devices typically constitute a small fraction of the total number of devices on the LAN.

In a subsequent step, the system 10 executes an ARP poisoning loop (shown generally at 57 and beginning at 58), wherein communications with the entire valid intra-LAN ARP-table (the IP range defined at 54) is poisoned except for the white listed devices defined at 56. That is, as shown at box 60, for each IP address within the defined valid IP range, the system 10 first determines if each IP address is associated with a white listed device (such as the default gateway or a printer) and if it is not (as shown at box 62), the system 10 creates a false (or "poisoned ARP") entry in the ARP table for the IP address. It is understood that the poisoned ARPs or these implementations are unique, randomly-generated MAC addresses that conform to proper formatting but which are not in use within the LAN 12.

Following the iteration of such described ARP poisoning process 50, the subject host is only able to communicate directly with the white listed (box 56) hosts.

Figure 4D:
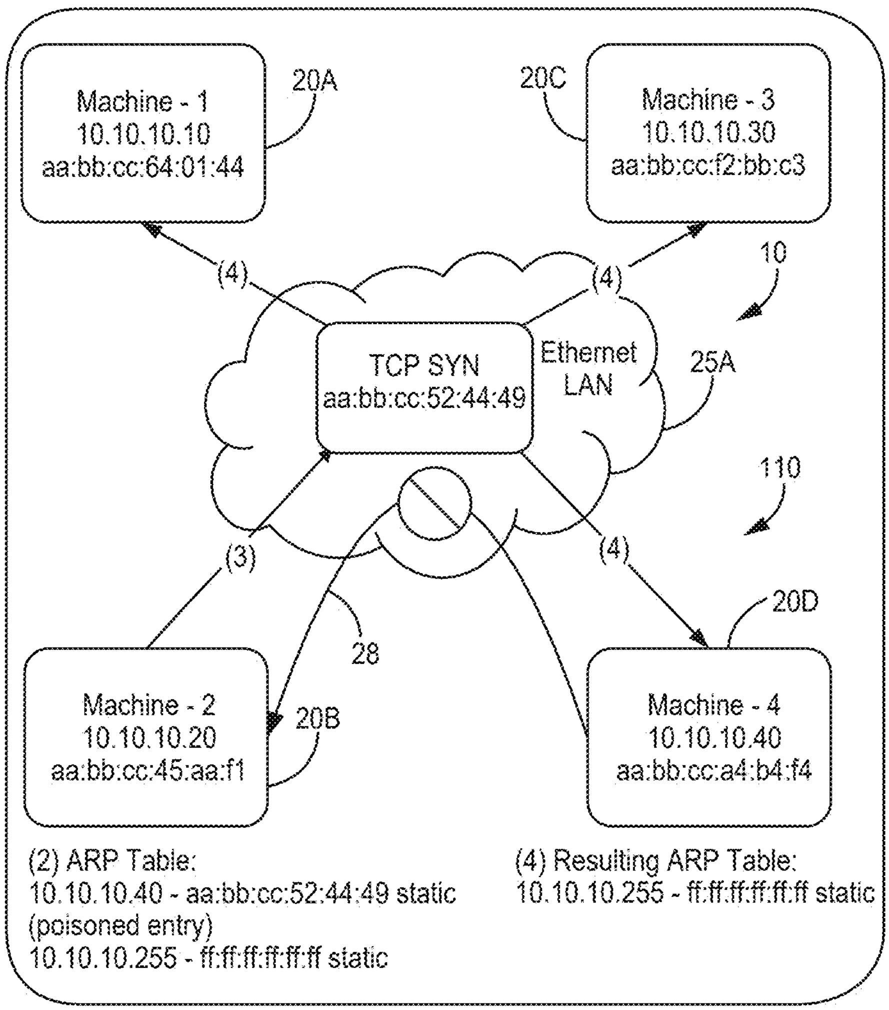
FIG. 4D is a cartoon schematic of an ARP broadcast process on a local area network where Machine-2 has a poisoned ARP entry.

As an illustration of the impact of this ARP poisoning process, FIG. 4D depicts an implementation of the system 10 executing the ARP process where Machine-2 has a poisoned ARP entry for 10.10.10.40. In this implementation, Machine-2 has packets it desires to send to 10.10.10.40 (Machine-4). Machine-2 queries in its' local ARP table (cache) and determines that it has a MAC address for 10.10.10.40. (This is the poisoned ARP entry for Machine-4. This MAC address is randomly generated1 and contains a MAC address which is not in use on the network.)

Machine-2 then attempts to establish a connection to 10.10.10.40 using the poisoned MAC aa:bb:cc: ff:bb:a9. A SYN request is sent on the network, attempting to establish a connection.

The Ethernet switch does not have a CAM table entry for this MAC address and floods (sends) the request to all ports. All machines on the network then hear this request and ignore it since the MAC address used does not match any host on the LAN, Machine-2 is unable to establish communications with Machine-4.

Importantly, at this point the ARP table of Machine-4 does not contain the correct MAC address for Machine-2. However, if Machine-4, attempts communication with Machine-2. Machine-4 can learn the correct MAC address of Machine-2. This is desirable behavior so that while Machine-2 is ARP poisoned it does not break ARP entirely, which helps prevent IP address collisions on the LAN segment. Even though Machine-4 can learn the MAC address of Machine-2, it cannot establish communication with Machine-2 because if it sends traffic to Machine-4, it will never receive a SYN-ACK necessary to establish TCP communications because Machine-2 contains a poisoned MAC address for the IP address of Machine-4.

It is also important that when generating random MAC addresses in certain implementations, the system will: begin with the first six digits of the MAC using a valid hardware manufacturer's digits; these will be followed by six additional hex digits such that when these hex digits are combined they do not match any device on the LAN.

The switch port flooding described above can be used by certain implementations of the system 10 to detect attacks or intrusion. That is, in implementations of the system 10 configured to execute ARP poisoning, where that poisoning is active on a host blocking one or more other hosts on the network that the special behavior of the above-mentioned switch port flooding is useful because network sensors located anywhere on the network (like those shown in FIG. 1D at 27) can detect the SYN-ACK (response) from any computer device or host which is the target of a connection from a blocked host.

Certain implementations of the system 10 comprise an intrusion detection system that is constructed and arranged to identify attacks via the poisoned ARPs or poisoned routes.

Figure 4E:
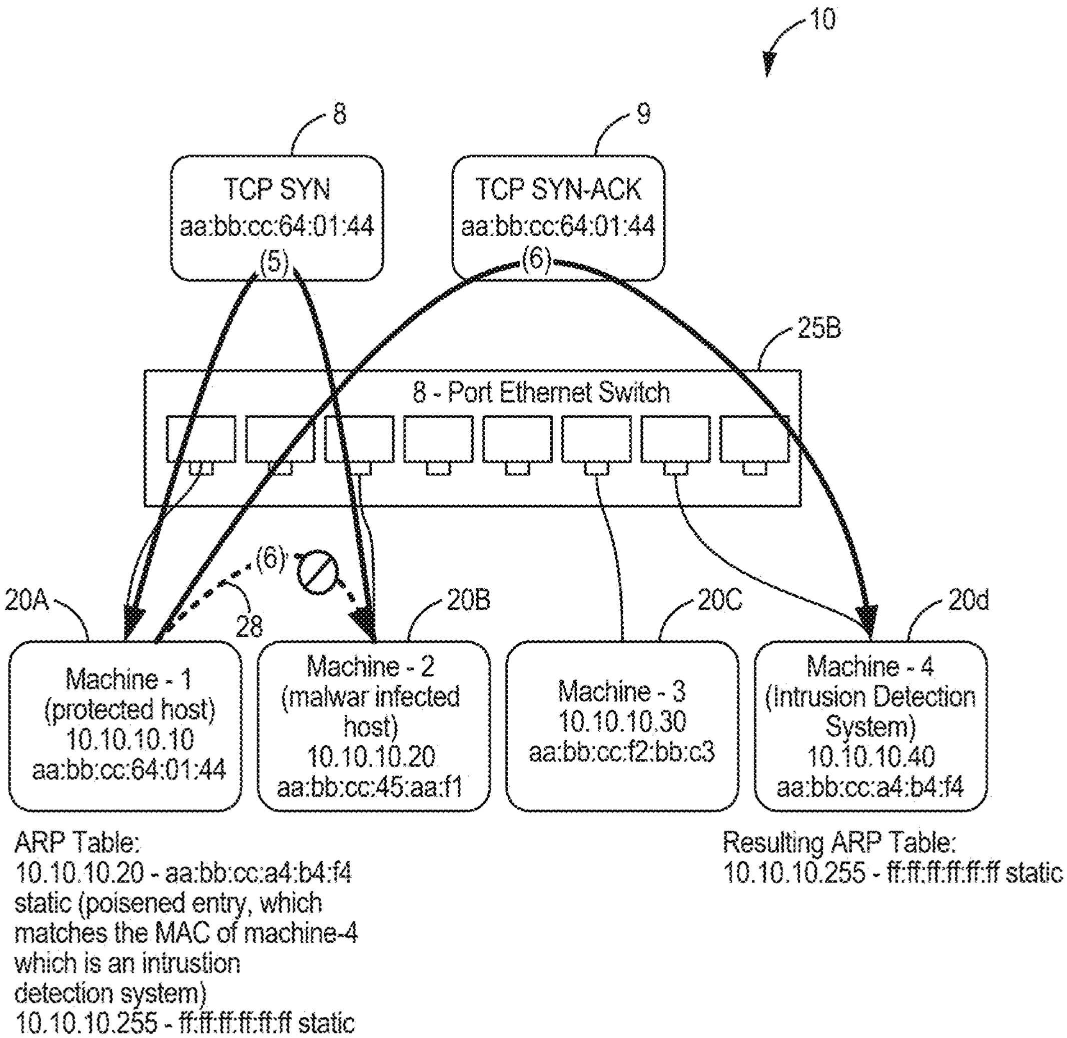
FIG. 4E is a further schematic of an ARP broadcast process on a local area network where Machine-2 has a poisoned ARP entry.

As shown in the implementation of FIG. 4E, several devices 20A, 20B, 20C, 20D are connected to an ethernet switch 25B. The first device 20A (Machine-1) has a poisoned ARP entry so that communications to the second device 20B (Machine-2) are blocked 28.

It is understood that prior traffic has allowed the switch 25B to populate its CAM table with the MAC address and physical ports associated with each of the several devices 20A, 20B, 20C, 20D.

In this implementation, the second device 20B (Machine-2) is infected with malware, and is attempting to make a connection to the first device 20A (Machine-1). In this implementation, the poisoned ARP entry on the first device 20A (Machine-1), for the second device 20B (Machine-2) IP address is the actual MAC address of the fourth device 20D (Machine-4), which is an intrusion detection system.

Accordingly, as Machine-2 20B attempts to communicate with Machine-1 20A it sends a SYN 8, the first part of a three-way handshake to Machine-1 20A.

In turn, Machine-1 receives the SYN message from Machine-2 and attempts to reply back to Machine-2, but since it has a poisoned ARP entry 28 for Machine-2, the TCP SYN-ACK 9 response is sent by Layer 2, and by the Ethernet switch 25B to Machine-4 the Intrusion detection system 20D.

In these implementations, a blocked host can identify the true MAC address of another computer on the network. If it attempts to initiate a conversation with a host which is blocked, the response from the blocked host will be sent to a poisoned MAC address. Since the Ethernet switch doesn't identify the location of the false MAC address that is used by the blocked host, it will flood (send) the response packet to all switch interfaces across the entire network in an attempt to locate the computer with the false MAC address.

Normally, when the sought computer is located, the switch will update its CAM table so that it can send traffic only to necessary devices. However, in implementations executing ARP poisoning, while this traffic is being flooded to all switch ports, it allows a network sensor (such as that shown in FIG. 1D at 27) connected to any switch port to monitor these SYN-ACK responses from any workstation on the entire network which is being connected to by a host which is blocked. This behavior lends itself very well to detecting an intrusion or malware on the network 12. One way to think of this is that the SYN-ACK is essentially a broadcast like an alarm on the network which could signal an intrusion detection system.

Continuing on, instead of using a poisoned ARP entry which is unique to every host on the network, a poisoned ARP entry could be created which relates directly to an intrusion detection system. Then, when the SYN is received by a host with LAN isolation enabled, the host would attempt to respond back to the SYN with the SYN-ACK but the SYN-ACK would be sent directly to an intrusion detection system/sensor. By using that technique, the Ethernet switch can thereby be configured to update its CAM table to learn the MAC address of the intrusion detection system, and when the protected host issues its SYN-ACK, it would not be flooded to all endpoints because the switch has learned CAM table entry matching the MAC address of the intrusion detection system.

This technique also applies to poisoned routing where a poisoned ARP entry is defined as the destination gateway for blocked traffic. This therefore, lends itself to using the poisoned routing technique on other operating systems instead of using null routing or blackhole routing.

II. Route Poisoning

Routing is a process whereby packets are examined, and forwarded appropriately based on the destination IP address and based on the routes, and default route or default gateway configured on the PC. When a destination IP address is determined to be not on the local network segment, the packet is forwarded to the default gateway. Normally when packets are received and are destined for PCs on the local network, they are just forwarded on the local network. However, if a more specific route is encountered, Windows® (and other OS's) will forward the packet based on the most specific route. For example, assume: 192.168.2.10 on a /24 network, with a mask of 255.255.255.0.

Normally, if a device 20 needs to communicate with another computer with the IP address of 192.168.2.42, the other device 22 is determined by examination of the network mask and the packet is sent directly on the current network segment. More specifically it is not forwarded to the default gateway.

However if route redirection on the second device 22, we had implemented Route redirection, we can intentionally break the ability of the second device 22 to communicate with the first device 20.

It is understood that redirection can be achieved by installing a route on the second device 22 for a single host of the first device 20. In routing terms would appear as follows:

Route 192.168.2.10/32 192.168.2.254; where 192.168.2.254 can be any IP address that will not forward traffic to 192.168.2.10 technically the routing table on the first device 20 would then appear as:

Route 192.168.2.10/32 192.168.2.254

Route 0.0.0.0/0 192.168.2.1; where 192.168.2.1 is the default gateway for this network segment.

It is understood that in various operating systems, such as Windows® 10, pinging a blocked host results in a timed out request. The blocked device appears in the ARP table and is discoverable, and the poisoned route entries are visible in the routing table. However, these entries cannot be deleted unless the user has administrative rights and/or permissions. Thus, these breaks in communications are persistent. It is understood that the implementations of both ARP poisoning and route poisoning can be adapted to applications utilizing IPv6.

Figure 5A:
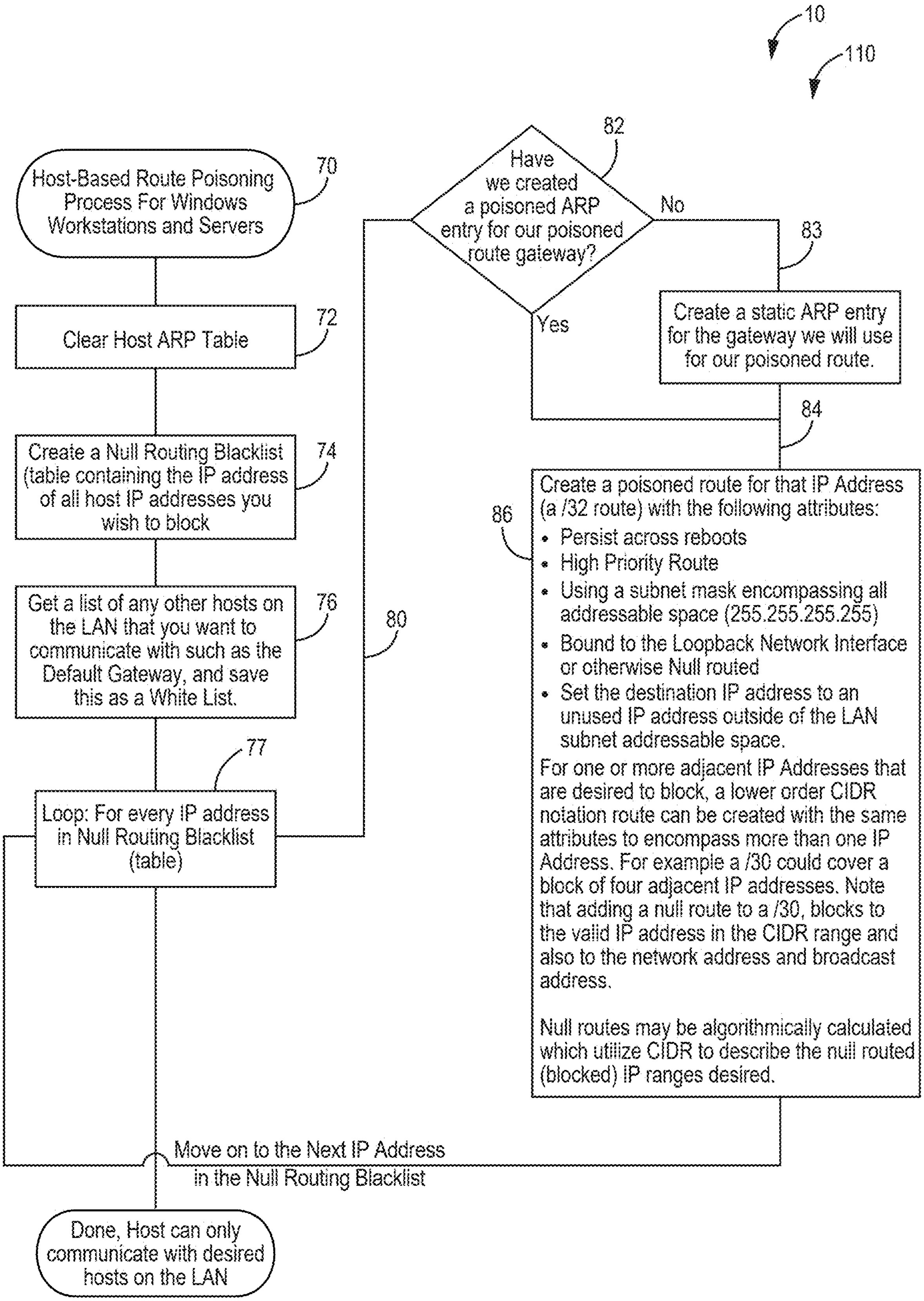
FIG. 5A is a flow chart showing the system 10 executing a route poisoning process via the platform, according to one implementation.
Figure 5B:
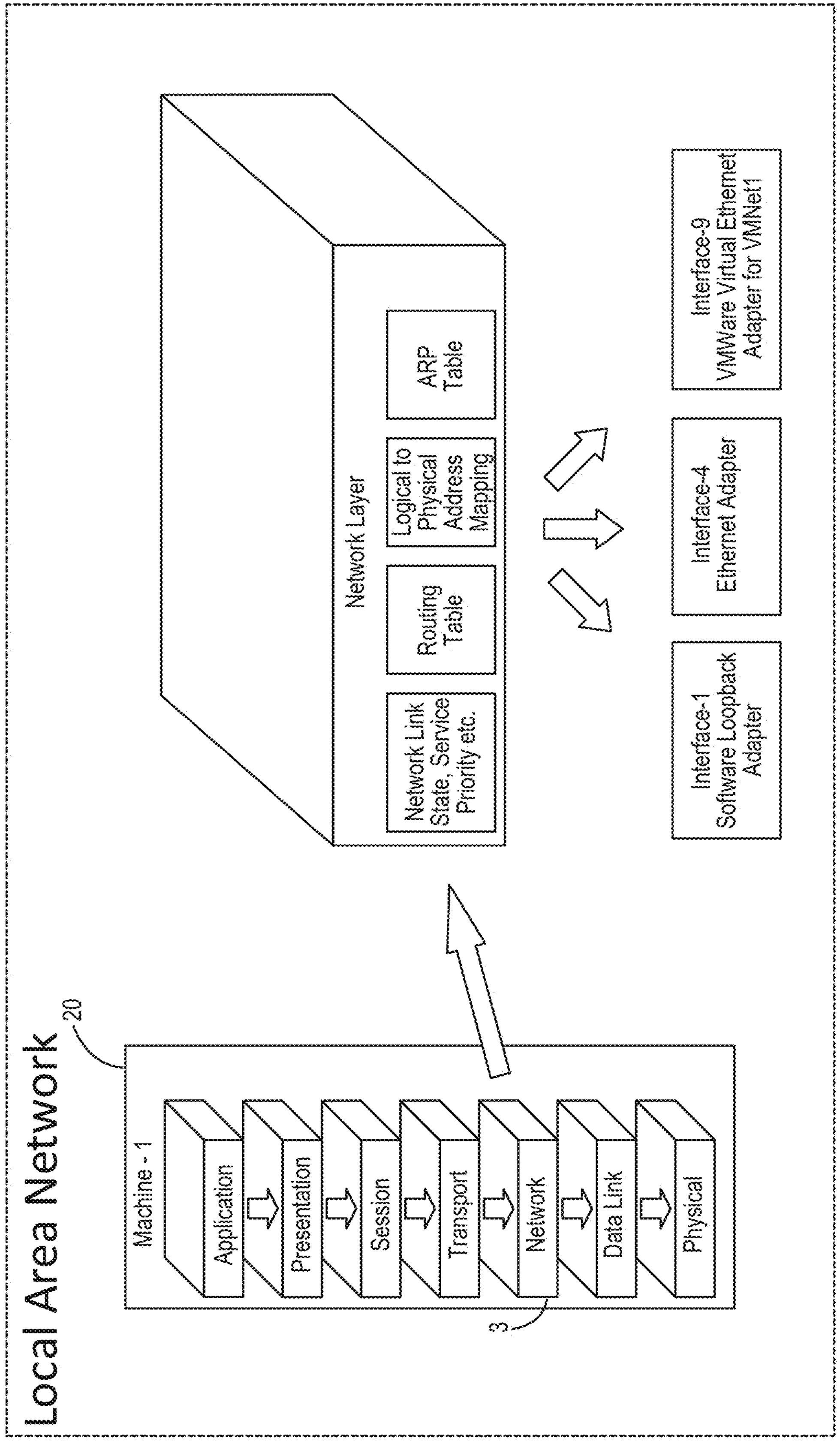
FIG. 5B is an up-close schematic of the network layer, according to one implementation.

FIG. 5A depicts an exemplary implementation of a host-based route poisoning process 70. In this implementation, several steps are executed, which can be performed by a user and/or administrator, or executed via a processor and application running on the LAN. It is understood that the described steps may be performed in alternate orders, and that in alternate implementations some steps may be omitted.

Continuing with the route poisoning 70 implementation of FIG. 5A, an individual device is isolated from the LAN using route poisoning 70 as follows. As an initial step, the device's host ARP table is cleared (box 72). It is understood that the host ARP table can be cleared by a user/administrator, or that a processor may execute an application that results in the clearance.

In another step, the system 10 establishes a null routing blacklist (box 74). In various implementations, this can be done via the subnet mask assigned to the host or a known/predefined size by lookup table. It is understood that this can also be performed by a user/administrator, or that a processor may execute an application that results in the determination of the valid host space and establishes the parameters of the poisoning. It is understood that in use according to various implementations, the process is executed such that it is impossible to modify these settings as an unprivileged end user. The system will have permission to make the changes necessary to effectively implement any process steps and/or restore connections, thereby preventing lateral attacks.

In another step, white listed devices are established (box 76), that is, the system 10 establishes and/or identifies other hosts that the subject device should continue to communicate with, such as the default gateway and/or a networked printer (shown in FIG. 1D at 30 and 26, respectively). In various implementations, these rules can be established by the administrator, by business rules, by algorithm, by artificial intelligence and/or a combination of these approaches. It is further understood that these established required devices typically constitute a small fraction of the total number of devices on the LAN.

In a subsequent step, the system 10 executes a route poisoning loop (shown generally at 77 and beginning at 78), wherein communications with the entire valid blacklisted table (defined at 74) is poisoned except for the white listed devices defined at 76.

While this is similar in outcome to the ARP poisoning process described above in relation to FIG. 4A, it is understood that there are significant differences which may make this a more suitable method. Specifically, for networks larger than a /24, route poisoning can be accomplished with far fewer rules than would be necessary with ARP poisoning alone. Additionally, if these techniques were applied to IPv6, this is a valid method to provide isolation. In operating systems other than Windows®, a firewall may not be available, and route poisoning and/or null routing can provide an effective approach for achieving network isolation and allow for increased efficiency.

It is understood that other operating systems typically would not require the creation of a poisoned ARP entry. Rather, the system 10 can specify a null route or blackhole route. It would be appreciated by one skilled in the art: one responds as "destination host unreachable" and one simply does not respond.

That is, for each IP address within the defined valid IP range, the system 10 first determines if each IP address is associated with a white listed device (such as the default gateway or a printer). If it is, as with ARP poisoning, the system 10 moved on to the next IP address within range.

However, in these implementations, if the IP is not (as shown with line 80), the system 10 establishes if a poisoned ARP entry has been created for the poisoned route gateway (box 82).

If no poisoned ARP entry is found (line 83), a static ARP entry for the gateway or poisoned ARP is created (box 84).

Continuing with FIG. 5A at line 84, with the poisoned ARP created, the system creates a poisoned route (box 86).

In the poisoned route of FIG. 5A, create a route for that IP Address (a /32 route) with the following attributes: persist across reboots; high priority route; using a subnet mask encompassing all addressable space (255.255.255.255); bound to the loopback network Interface or otherwise null routed; Set the destination IP address to an unused IP address outside of the LAN subnet addressable space. For one or more adjacent IP Addresses that are desired to block, a lower order CIDR notation route can be created with the same attributes to encompass more than one IP address. For example a /30 can cover two adjacent IP addresses. For any network poisoned routes may be algorithmically calculated which utilize CIDR to describe the blocked (poisoned) IP ranges desired. Alternate implementations are of course possible.

Figure 5C:
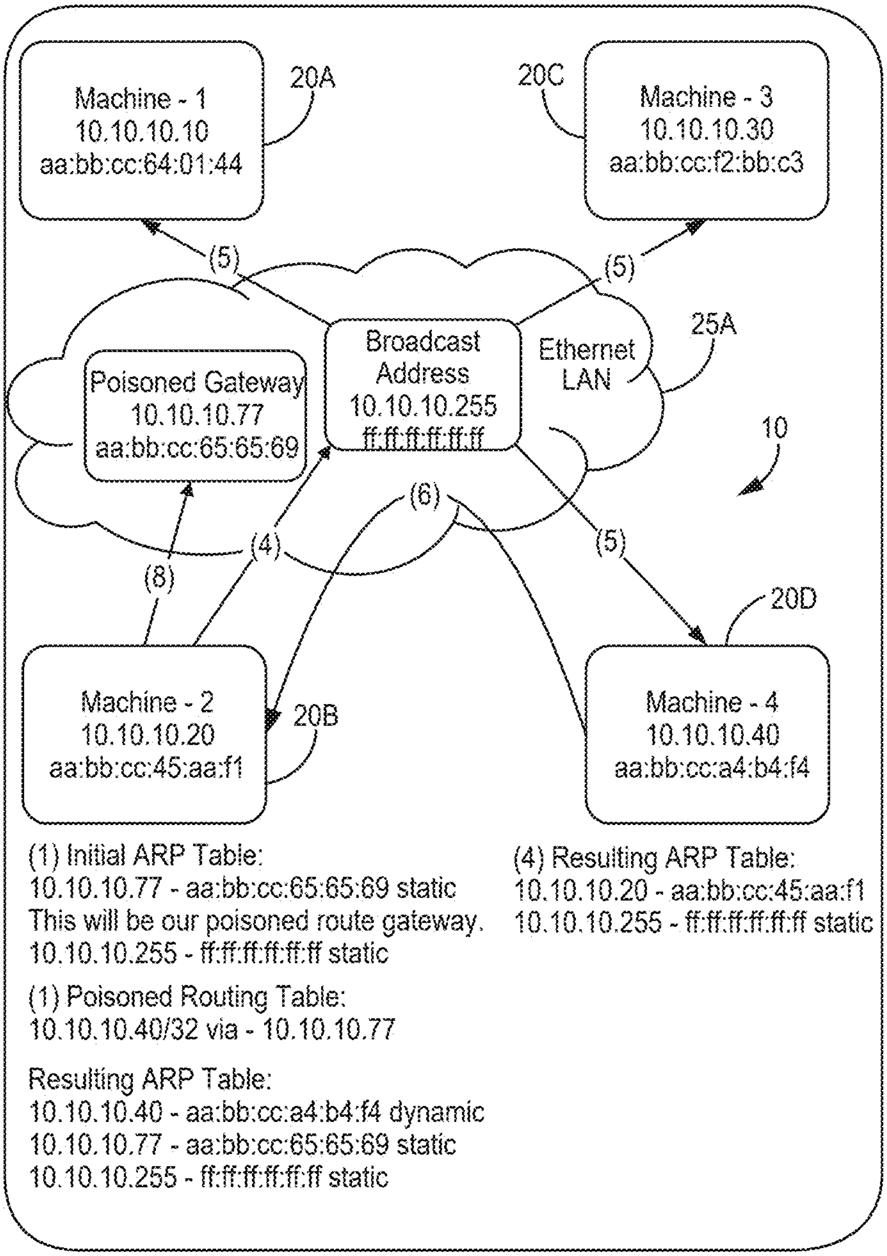
FIG. 5C is a cartoon schematic of a poisoned routing process on a local area network.

FIG. 5C depicts an implementation of the system blocking Windows® host communications with poisoned routing 70. In this implementation, it is desirable to block the Windows® host (Machine-2) from communicating with Machine-4 on the network. To block communications we first create a static ARP entry for an unused IP address. We call this the poisoned gateway. We then create a poisoned static route for Machine-2, telling it to route all traffic for Machine-4 through the poisoned gateway.

Machine-2, has packets it desires to send to 10.10.10.40.

Machine-2 queries its local ARP table (cache) and determines that it does not know the MAC address for 10.10.10.40.

Machine-2 then examines the subnet mask: 255.255.255.0, and determines the broadcast address is 10.10.10.255. It then creates an ARP request for the MAC address for 10.10.10.40. This request is sent to the broadcast address for the network (10.10.10.255). This is done by sending the packet to: ff:ff:ff:ff:ff:ff. All machines on the network hear this request. The switch floods (sends) this request to all hosts on the network.

All machines receive and ignore the request other than Machine-4 who determines that it has the IP address requested. Machine-4 update's the ARP Table to contain the IP and MAC address of Machine-2:10.10.10.20; aa:bb:cc:45:aa:f1

Machine-2 then Replies with the MAC Address by Sending a Response to 10.10.10.20; aa:bb:cc:45:aa:f1

When the ARP response is received by 10.10.10.20, it updates its ARP Table (cache): 10.10.10.40; aa:bb:cc:a4:b4:f4

Finally, Machine-2 tries to send traffic to Machine-4. When packets are sent, Machine-2 observes the poisoned route and sends traffic destined for Machine-4 via the poisoned gateway 10.10.10.77. This is done by sending traffic to the MAC of the poisoned gateway aa:bb:dd:65:65:69. As a result of this, Machine-4 never receives the packets and a three way handshake is never established, thereby breaking communications from Machine-2 to Machine-4.

If subsequently Machine-4 attempts to establish communications with Machine-2, Machine-2 will receive the first part of the three way handshake from Machine-4, but when it replies with a SYN-ACK, it sends the SYN-ACK to the poisoned default gateway.

Using this technique, a Windows® host can be protected from communicating with any other host on the same network segment. This can be accomplished without modifying other client computers or modifying the network itself, or by modifying the network configuration.

Switch CAM Table(s): In this process, importantly, the Ethernet switches on the network also learn the MAC addresses of endpoints connected to their interfaces. This information is stored in the CAM (Content Addressable Memory) table.

When packets are received for devices where the port is unknown, the switch floods or sends the packet for the unknown hosts to all switch ports. During the ARP process, the switch learns the port location for all hosts.

Following the iteration of such described route poisoning process 70, the subject host is only able to communicate directly with the required or otherwise established (box 76)

hosts. Examples of poisoned routes 99 at several levels are shown in FIGS. 5D-1 and 5D-2.

Briefly, FIG. 5D-1 shows a /26 CIDR block to describe a poisoned route, according to one implementation, where the network address is 0.64 and the usable IP addresses on that CIDR block are 0.65 through 0.126 and the broadcast address is 0.127 FIG. 5D-2 is using a /30 CIDR block to describe a poisoned route, according to one implementation where the network address is 0.100. The usable IPs on that CIDR block are 0.101 and 0.102. The broadcast address is 0.103. It is understood that in these implementations the route poisoning allows the platform 110 to segment or otherwise quarantine a set of IPs. It is understood that the usable IPs, network and broadcast addresses all become poisoned with the poisoned route entry.

ARP poisoning and route poisoning should be considered to be binary On/Off methods to prevent communication between specific hosts on a network. These all or nothing approaches are useful in the respect that if two endpoints don't need to communicate, communication can be prevented using either ARP or Route based poisoning. In the event that some traffic may be useful, it is possible to configure Windows® Firewall or other firewalls to provide much more sophisticated filtering, thereby allowing specific applications or specific ports or protocols. These things are well understood and extend the concept of the isolation system 10 to allow partial or limited connectivity using Firewall based rules.

III. Null Routing

Figure 6:
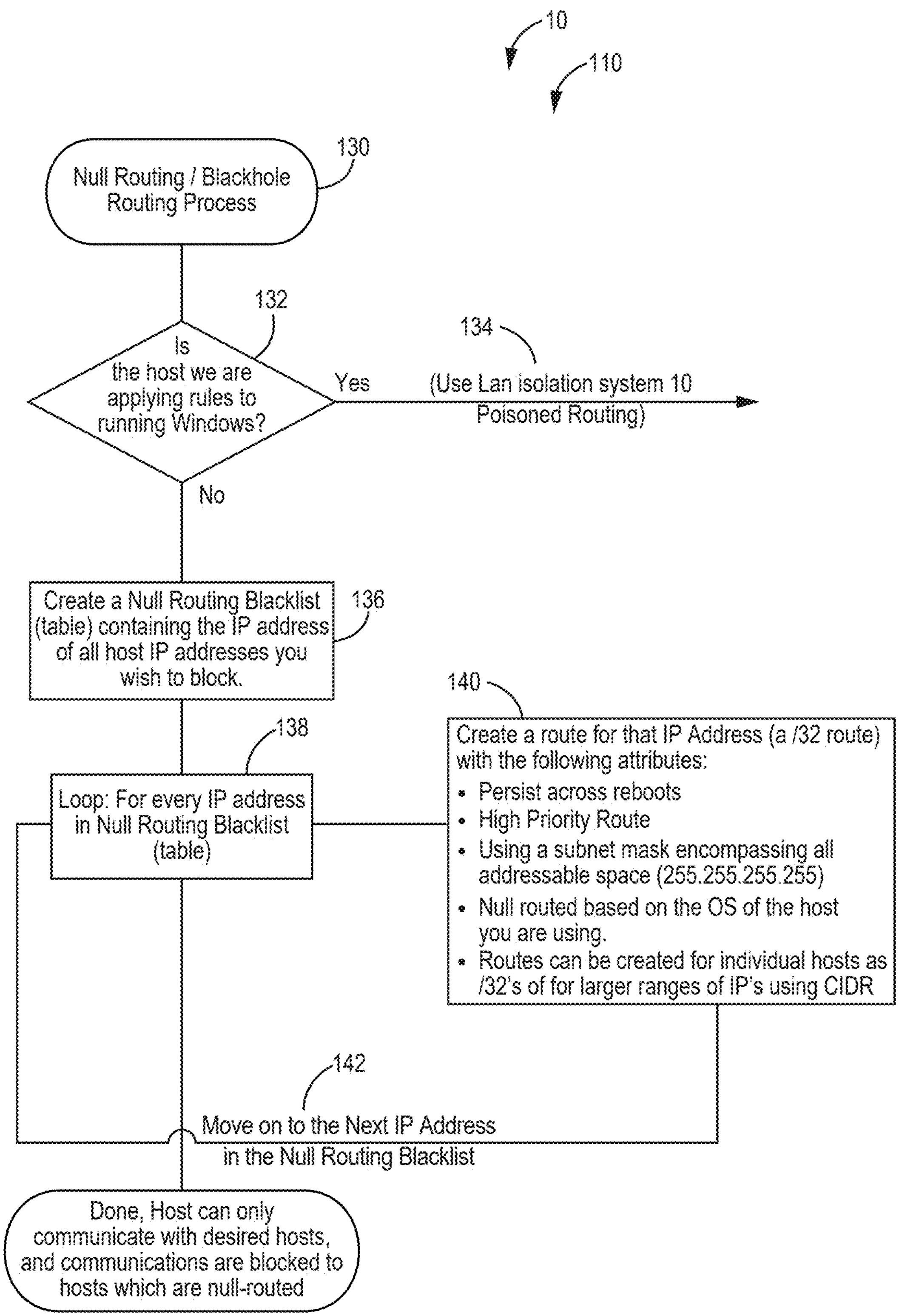
FIG. 6 is a flow chart showing the system 10 executing a null routing/blackhole process via the platform, according to one implementation.

FIG. 6 depicts an exemplary implementation of a null routing process 130 utilized in certain implementations of the system 10. In these implementations, several steps are executed, which can be performed by a user and/or administrator, or executed via a processor and application running on the LAN. It is understood that the described steps may be performed in alternate orders, and that in alternate implementations some steps may be omitted.

Continuing with the null routing process 130 implementation of FIG. 6, in these implementations the system 10 evaluates if the host or device that the system is applying rules to is running Windows® (box 132). If it is, the system 10 executes an implementation of the isolation system 10 discussed above, such as poisoned routing 90 (shown at line 134).

If the host is not running Windows®, the system 10 then creates a null routing blacklist (box 136). In various implementations, this can be done via the subnet mask assigned to the host or a known/predefined size by lookup table. It is understood that this can also be performed by a user/administrator, or that a processor may execute an application that results in the determination of the valid host space and establishes the parameters of the poisoning. It is understood that in use according to various implementations, the process is executed such that it is impossible to modify these settings as an unprivileged end user. The system will have permission to make the changes necessary to effectively implement any process steps and/or restore connections, thereby preventing lateral attacks.

In another step, the system 10 executes a loop for every IP address in the null routing blacklist (shown at boxes 138, 140 and 142) where a route for each IP address (a /32 route) having one or more of the following attributes: a route that is persistent across reboots, a high priority route; using a subnet mask encompassing all addressable space (i.e. 255.255.255.255), null routing based on the OS of the hose, routes created for individual hosts /32's or for larger ranges of IPs using CIDR.

For blocking one or more adjacent IP addresses, a lower order CIDR notation route can be created with the same attributes to encompass more than one IP Address. For example a /30 could cover a block of four adjacent IP addresses. Note that adding a null route to a /30, blocks to the valid IP addresses in the CIDR range and also to the network address and broadcast address.

Following the iteration of such described route poisoning process 130, the subject host is only able to communicate directly with the required or otherwise established (box 134) hosts.

In certain implementations, null routes may be algorithmically calculated which utilize CIDR to describe the null routed (blocked) IP ranges desired.

It is understood that blackhole routes do not send any response to the host sending traffic to a device. Instead, null routes generate a "Destination Host Unreachable" ICMP response instead of blackholing the traffic.

In Certain Illustrative Examples:

1) To assign a blackhole route a single IP address (192.168.1.2), use:

route add—host 192.168.1.2 127.0.0.1—blackhole

2) To assign a blackhole route for an entire network (192.168.1.0/24), use:

route add—net 192.168.1.0/24 127.0.0.1—blackhole

3) To assign a null route a single IP address (192.168.1.2), use:

route add—host 192.168.1.2 127.0.0.1—reject

4) To assign a null route for an entire network (192.168.1.0/24), use:

route add—net 192.168.1.0/24 127.0.0.1—reject

To Enable the Blackhole or Null Routes on Boot, Add them to /Etc/Rc.Conf:

static_routes="null1 null2"
route_null1="—host 192.168.1.2 127.0.0.1—blackhole"
route_null2="—net 192.168.1.0/24 127.0.0.1—reject"
Blackhole routing on Linux (iproute2)
Route add—host 192.168.1.0 127.0.0.1—blackhole
Blackhole routing on Linux (IPtables)
Route add 192.168.1.0 gw 127.0.0.1 lo
Null routing on Linux (IPtables)
Route add-host 192.168.1.0 reject

IV. Firewall Blocking

When implementing ARP poisoning, individual IP addresses are poisoned one at a time. With all forms of route poisoning, null routing and/or blackhole routing, routes can be poisoned for an individual IP address OR for a block of IP addresses which can be described by a CIDR block. However, it is not possible to block a range of IP addresses without regard for their CIDR in groups.

Figure 7:
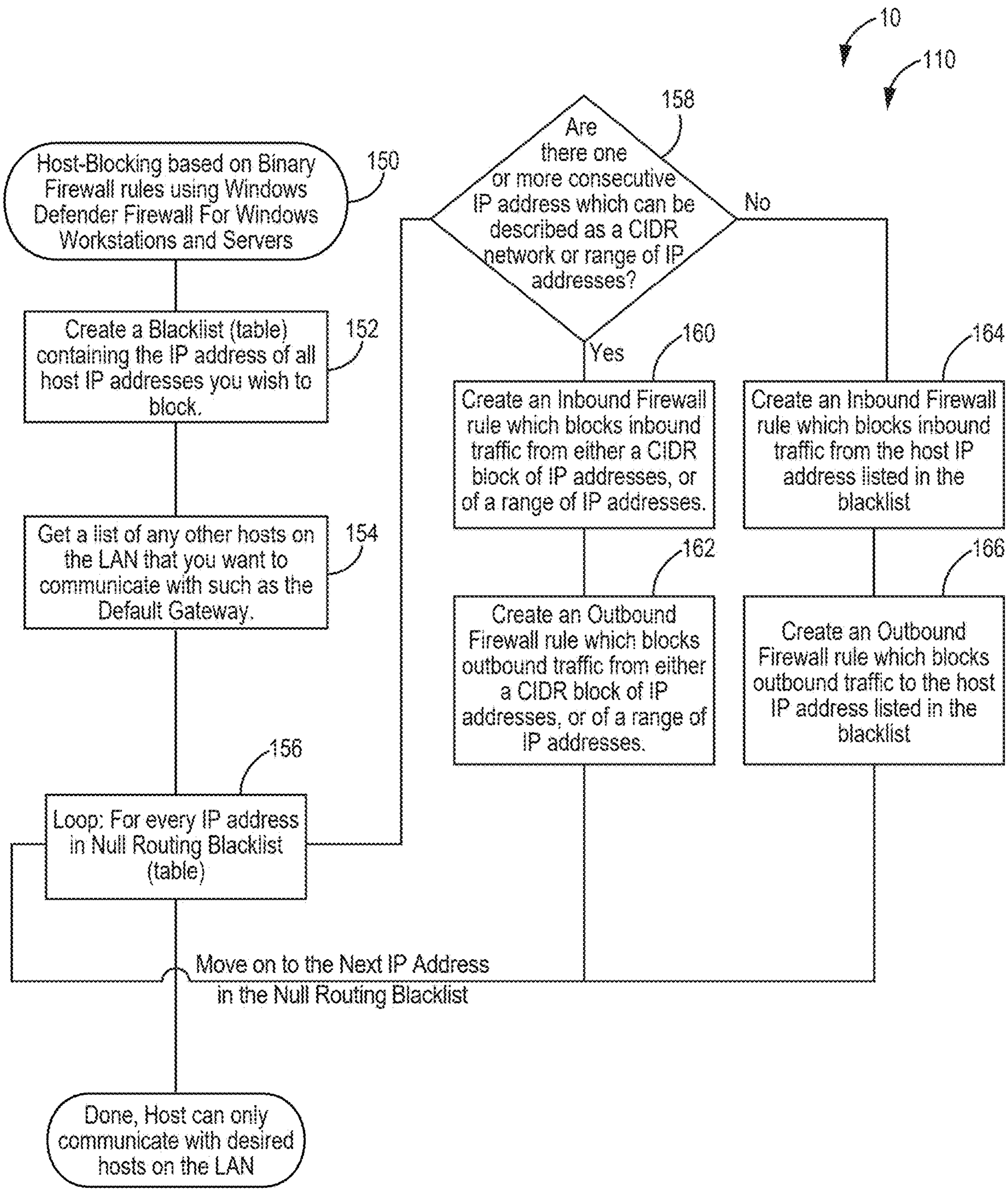
FIG. 7 is a flow chart showing the system 10 executing a firewall rules, or binary host blocking via the platform, according to one implementation.

However, under certain implementations of the system 10 executing firewall rules via the platform 110, such as that shown in FIG. 7 at 150, blocking can occur to a single host, to a range of IP addresses, or to a range that is defined as a CIDR block (as is shown in FIGS. 5D-1 and 5D-2).

As is shown in FIG. 7, in certain implementations of the system 10 utilizing firewall rules can be executed at layers 4, 5, 6 and 7. In these implementations, several steps are executed, which can be performed by a user and/or administrator, or executed via a processor and application running on the LAN. It is understood that the described steps may be performed in alternate orders, and that in alternate implementations some steps may be omitted.

In these implementations, the system 10 then creates a blacklist (box 152). In various implementations, this can be done via the subnet mask assigned to the host or a known/predefined size by lookup table. It is understood that this can also be performed by a user/administrator, or that a processor may execute an application that results in the determination of the valid host space and establishes the parameters of the poisoning.

Again, it is understood that in use according to various implementations, the process is executed such that it is impossible to modify these settings as an unprivileged end user. The system 10 will have permission to make the changes necessary to effectively implement any process steps and/or restore connections, thereby preventing lateral attacks.

In another step, the system 10 establishes a whitelist (box 154), as has been previously described, designating necessary communication partners, such as the default gateway.

In a subsequent step, the system 10 executes a loop for every IP address in the null routing blacklist (beginning at box 156) where the system 10 determines if there are consecutive IP addresses which can be described as a CIDR network or a range of IP addresses (box 158).

If there are consecutive addresses, the system 10 is configured to create an inbound firewall rule (box 160) that blocks inbound traffic from either a CIDR block of IP addresses, or range of IP addresses, as would be understood. In another step, the system 10 is constructed and arranged to create an outbound firewall rule (box 162) blocking outbound traffic to either a CIDR block of IP addresses, or of the range of IP addresses. That is, according to these implementations, a range of IP addresses can be specified as a range; 192.168.1.15-192.168.1.57. Alternatively a range of IP addresses can be specified as a CIDR block; 192.168.1.32/27 would describe the IP range from 192.168.1.32 through 192.168.1.47

It is understood that to block one or more adjacent IP addresses, a lower order CIDR notation route can be created with the same attributes to encompass more than one IP Address. For example a /30 could cover a block of four adjacent IP addresses. Note that adding a firewall rule to a /30, blocks to the valid IP addresses in the CIDR range and also to the network address and broadcast address. Firewall rules routes may be algorithmically calculated which utilize CIDR to describe the blocked IP ranges desired.

For individual IP addresses the single IP address is specified as an argument to create the firewall rule. If there are not consecutive or otherwise adjacent IP addresses at box 158, the system 10 is configured to create an inbound firewall rule (box 164) that blocks inbound traffic from the host IP address listed in the blacklist. In another step, the system 10 is constructed and arranged to create an outbound firewall rule (box 166) blocking outbound traffic the host IP address listed in the blacklist.

In various implementations, firewall traffic can be blocked either inbound, or outbound or in both directions.

The system 10 iterates for each IP address in the blacklist.

In various operating systems, such as Windows® 10, pinging a blocked host results in a general failure. The blocked host does not show up in the ARP table, and it is not discoverable. The firewall rules are visible in the Windows® Defender firewall settings, however they cannot be removed unless the user has administrative rights.

If filtering (not outright blocking is desired) much more advanced rules can be created allowing for higher level functions such as port, protocol, user, or application.

It is understood that Windows® Firewall is very flexible with a voluminous number of options to control traffic based on the application, service, user, protocol, port, IP address, etc. However, with all these things it remains sufficiently difficult as to be beyond the capability of most users to block all traffic from specific network devices, such as an IoT device.

There are advantages and disadvantages to using Windows® firewall to control such traffic. Some of those negatives include but are not limited to:

1. Writing rules for Windows® firewall at the host level;
2. Managing rules at the workstation host level;
3. Understanding and managing complex rules based on PC groups which are allowed to access specific things but prohibited from others;
4. Writing rules whereby some traffic is allowed while other traffic is denied to a specific device.

These are normal firewall rules that can be complex based on the needs of the applications installed.

The isolation system 10 platform 110 executing firewall rules according to various implementations is configured so as to take precedence over any additional rules introduced by malware or other attacks is. It is understood that within current versions of the Windows® firewall, the firewall rule order cannot be controlled by the user and rules are ordered automatically by the Windows® firewall. If an application, such as malware, creates a rule in the Windows® firewall to allow all traffic, or to allow specific traffic to/from said application, that the application could subvert other rules in the Windows® firewall. Importantly, the binary (blocking) firewall rules implemented by the isolation system 10 are organized to supersede (or be executed before) all other rules in the firewall and will therefore override any rules that can be created by malware. Stated differently, blocking rules are applied first, and since traffic is blocked at the top of the firewall rule sequence, any rule added lower in the firewall rule order process by malware would be irrelevant in the context of blocked hosts because traffic has already been dropped by the firewall and is not subjected to subsequent "allow" rules.

In an illustrative example, the system 10 can restrict the first device 20 from communicating with the second device 22. On the second device 22, within the Windows® firewall rules the system 10 can establish two rules: 1) an ingress firewall rule blocking traffic sent to the second device 22 from the first device 20, and 2) an egress firewall rule blocking the second device 22 from sending any traffic to the first device 20. It is understood that these rules are binary (on/off).

One important aspect of all these controls is that the controls rely on the IP address of the hosts. So in a typical LAN network where DHCP is used to assign IP addresses, changes made within the isolation system 10 are linked-to the IP address of and the MAC address of the host the user wishes to allow or deny.

In one exemplary application of the system 10 in an office network where there are dozens of machines, and where the isolation system 10 rules are running. If the DHCP server 24 were to fail, and all clients 20, 22 on the network were to suddenly get new IP addresses, any of the isolation system 10 rules defined by a hard-coded IP address would be suddenly invalid.

For this reason, it will be useful (not mandatory) but certainly beneficial), for the network to communicate to cloud based servers to generate a black list of machine names, IP addresses and MAC addresses.

If this black list existed, and a system moved from one IP to another IP, endpoints on the network can quickly adapt and change the isolation system 10 rules according to the change.

ILLUSTRATIVE EXAMPLES

The following examples are put forth so as to provide those of ordinary skill in the art with a complete disclosure and description of how the articles, devices and/or methods claimed herein are made and evaluated, and are intended to be purely exemplary of the invention and are not intended to limit the scope of what the inventors regard as their invention. However, those of skill in the art should, in light of the present disclosure, appreciate that many changes can be made in the specific embodiments which are disclosed and still obtain a like or similar result without departing from the spirit and scope of the disclosed systems, methods and devices.

In one Example, assume two PCs on a network: the first device 20 is infected with dangerous malware, connected to port number 10 on an Ethernet switch.

The first device 20 has an IP address of 192.168.2.10 and a MAC address of: aa-bb-cc-dd-ee-01. The second device 22 has an IP address of 192.168.2.42 and a MAC address of: aa-bb-cc-dd-ee-44.

Normally, without the system 10, if these PCs are unpatched they are vulnerable, therefore the second device 22 is prone to infection from the first device 20.the first device 20. However, the second device 22 has been pre-configured via the system 10 to block communications with the first device 20, connected to port 42 on an Ethernet switch.

That is, the second device 22 has been protected with the system 10 from communicating with the first device 20 directly, the following illustrates how the attempted malware attack originating at the first device 20 (such as WannaCry or Petya) malware, where the first device 20 is searching the local network for computers to attack:

First, the first device 20 tries to search the network for PCs it can attack. Depending on the malware this may be random or sequential. We can assume when it reaches the IP address of the second device 22 that it attempts to communicate with this machine (the second device 22). In the process, the first device 20 generally:

1. Queries the ARP cache for the MAC address of the second device 22.
2. If a matching entry is found, the first device 20 skips the ARP discovery process and initiates a connection with the second device 22;
3. If a matching entry is not found in the ARP cache, the first device 20 sends a broadcast ARP discovery packet to 192.168.2.255 asking 192.168.2.42 to reply.

In this Example, the second device 22 then responds to this ARP discovery by responding 'the second device 22 IP address 192.168.2.42, MAC is: aa-bb-cc-dd-ee-44', this reply is sent only to the first device 20, so all other computers on the network do not receive this reply and do not store the MAC of the second device 22 when it replies.

After testing in Windows® 10, it was determined that even though the ARP cache is poisoned on the second device 22, the second device 22 responds to the ARP discovery packet from the first device 20 directly. This results in the first device 20 correctly learning the MAC address of the second device 22. This seems like a bad thing but is necessary to prevent IP conflicts. Also, the second device 22 cannot communicate with the first device 20 because every time it generates a packet and passes it down to layer-2, it will stamp it with the incorrect (poisoned) MAC address of the first device 20. This has been tested, and the first device 20 cannot communicate with the second device 22, and the second device 22 cannot communicate with the first device 20.

Returning to the Example, at this point, the first device 20 does have the MAC correct MAC address and updates its' ARP cache for the second device 22, but cannot communicate with the second device 22 because the second device 22's ARP cache because the first device 20 is permanently poisoned.

Typically, at the same time the second device 22 receives the broadcast packet it replied to the first device 20 it would also cache the MAC of the first device 20 (however this step is skipped because there is already a permanent cache entry for 192.168.2.10 as FF:FF:FF:B2:F4:14

As such, now, even if the first device 20 has the MAC of the second device 22 and sends the first packet in a three-way handshake to the second device 22 addressing the packet to the correct MAC address: aa-bb-cc-dd-ee-44, the second device 22 receives this packet and sends the response (second packet in the three-way handshake) back to the first device 20 using the poisoned MAC address: FF:FF:FF:B2:F4:14. The Ethernet switch will not deliver the packet to the second device 22 because the CAM table on the Ethernet switch knows only that the second device 22 resides on port: 17. Taken a step further a broadcast is never made with the target MAC of FF:FF:FF:B2:F4:14 so there is no way for the second device 22 to know that the first device 20 tried to respond. It will only think that there is a firewall in place on the first device 20 preventing it from communicating.

Example: Preventing ARP Redirection

In exemplary implementations of the isolation system, ARP redirection can be prevented via the isolation system 10 executing an ARP redirection prevention or "ARPRP" system. In exemplary implementations of the platform 110 comprising the ARPRP system, the isolation system 10 is able to: address the problems of static ARP, is able to detect ARP redirection generating alerts to users and administrators, and adding resiliency and auto-healing to static ARP.

In this Example, Using the LAN 12 of FIG. 1B, Assume:

- an uninfected device 20 has an IP address of 192.168.1.10 and a MAC of aa:aa:aa:aa:aa:aa;
- the default gateway 30 has an IP address of 192.168.1.1 and a MAC of bb:bb:bb:bb:bb:bb; and
- a compromised device 22 (say, for example, having be accessed by a hacker or having been infected with a virus or malware) has an IP address of 192.168.1.20 and a MAC of cc:cc:cc:cc:cc:cc In this Example, the Following Steps can Occur:

1. the uninfected device 20 sends an ARP discovery for the default gateway 30;
2. the default gateway 30 responds and the uninfected device 20 creates an ARP cache entry for the default gateway 30;
3. the compromised device 22 then sends an ARP redirection message to the uninfected device 20, falsely notifying the uninfected device 20 that the compromised device 22 is the new default gateway. It is understood that this can be achieved by sending an ARP packet to the uninfected device 20 with the IP of 192.168.1.1 with the MAC address of cc: cc: cc: cc: cc: cc;

4. the compromised device 22 then sends ARP redirection message to the default gateway, telling the default gateway 30 that the compromised device 22 is now the uninfected device 20. his is done by sending an ARP packet to the default gateway 30 with the IP of 192.168.1.10 with the MAC address of cc: cc: cc: cc: cc: cc;
5. now, when the uninfected device 20 sends traffic to the Internet, it sends it to the compromised device 22
6. similarly, when the default gateway 30 needs to send traffic to the uninfected device 20 it sends it to the compromised device 22.

By creating a static ARP entry on the uninfected device 20 for the default gateway 30, the compromised device 22 can now no longer send ARP redirection requests to the uninfected device 20.

By creating a static ARP entry on the default gateway 30 for the uninfected device 20, the hacker can now no longer send ARP redirection requests to the default gateway 30.

This is reasonably easy to accomplish but is difficult to implement in practice because, for example when the default gateway 30 is replaced with a new hardware replacement, the MAC address will change and communications to the uninfected device 20 (and all other statically configured devices) will break until the static ARP entry for the default gateway 30 is changed.

In various implementations in which the ARPRP system has been applied to the first device 20, the system 10 can detect if the MAC address for the default gateway 30 changes, and can dynamically update the static ARP entry accordingly.

As a further representative example, again using the schematic of FIG. 1D, an uninfected device 20 has an IP address of 192.168.1.10 and a MAC of aa:aa:aa:aa:aa:aa; and the default gateway 30 has an IP address of 192.168.1.1 and a MAC of bb:bb:bb:bb:bb:bb.

In this Example, assume that there is no compromised device on the network and the uninfected device 20 and the default gateway 30 both contain static ARP entries for each other as follows. This allows the uninfected device 20 and the default gateway 30 to communicate directly such that the device 20 is able to reach the Internet:

In the Initial State:

On the uninfected device 20

Static ARP IP=192.168.1.1=bb:bb:bb:bb:bb:bb

On (current) the default gateway 30

Static ARP IP=192.168.1.10=aa:aa:aa:aa:aa:aa

Next, assume a hardware failure of the default gateway 30. When this occurs, new hardware is installed replacing the default gateway 30, and as a result the uninfected device 20 is no longer capable of communicating because the new hardware has a new MAC address. Since the uninfected device 20 cannot reach the Internet, without our ARPRP system application, the only solution is to login to this workstation directly and to remove the static ARP entry for the previous the default gateway 30, replacing it with updated values for the new the default gateway 30.

This presents a problem if this were in effect on an entire network because the system administrator would typically need to login to each workstation.

For this reason, and for the complexity of creating and managing static ARP entries, static ARP entries are rarely used and networks are commonly highly vulnerable to ARP redirection attacks.

If it is instead assumed that the uninfected device 20 is configured to execute the ARPRP system application, and let's run through the same scenario and see how ARPRP system allows the PC to recover from a hardware failure of the default gateway. Note that various security rules can be put in place to allow this recovery to have more or less security depending on the needs of the organization.

In the initial state, the uninfected device 20 and the default gateway 30 both have reciprocal static ARP entries. In this Example, the ARPRP system application is running.

When a hardware failure occurs of the default gateway 30, and new the default gateway 30 is installed. At this point ARPRP system is configured to detect various pieces of information, such as that: the default gateway 30 is no longer reachable; the network is still connected; the network configuration of this PC has not changed; and other devices are still reachable on the local network In exemplary implementations, the ARPRP system now introduces business rules which can either automatically try to discover a new default gateway 30. In this way Intelligent ARP can watch to determine if the default gateway 30 was rebooted or it can learn the MAC address of a new default gateway if it is replaced. So when ARPRP system sees the default gateway is no longer reachable it then:

In one step, clears the static ARP entry for the default gateway 30.

In another step, monitors for the default gateway to come back online. If the same MAC address is seen when it comes back online, the same static MAC address is reinstated, and the user is unaware of all the activity done by ARPRP system. If a new MAC address is seen on the network, business rules can be applied as follows: the ARPRP system can prompt the user asking permission to update the default gateway; or prompting the user for a pin-code and then updating the default gateway; or just update the static ARP entry transparently without asking the user. No user interaction is required.

In a further step, after business rules are satisfied, the ARPRP system will retain the current static ARP entry for the default gateway 30 if it comes back online or can learn and apply a new static ARP entry for a new default gateway 30.

Following a Default Gateway 30 Failure:

On the uninfected device 20

Static ARP IP=192.168.1.1=bb:bb:bb:bb:bb:bb

New the default gateway 30

No static ARP entry exists initially for uninfected device 20

If a failure of the default gateway 30 hardware occurred, and the ARPRP system application then allowed the uninfected device 20 to re-learn the MAC of the default gateway 30 by learning the MAC of the new device. ARPRP system application then can create new static ARP entry on the uninfected device 20 as follows and setup a static ARP entry for uninfected device 20 on the new default gateway 30:

Following the Default Gateway 30 Failure:

On the uninfected device 20

Static ARP IP=192.168.1.1=dd:dd:dd:dd:dd:dd

New the default gateway 30

Static ARP IP=192.168.1.10=aa:aa:aa:aa:aa:aa

It may seem counterintuitive to want to have Static ARP that can automatically heal because it seems like this is normal behavior for a PC (to automatically and transparently discover ARP entries). However, by introducing ARPRP system, several things can happen:

First, for distributed organizations, failures of hardware are common, and managing static ARP entries places a huge burden on the organization. ARPRP system can allow organizations to use static ARP entries to tighten the security of their network while not requiring any other operating system changes.

Second, when changes occur, alerts can be generated alerting network administrators that a change in the network topology has occurred. Or alternatively workstations can be unusable until a PIN code is entered, ensuring that if such a change were to have occurred because of a hacker using ARP redirection, that PC's would detect that poisoning had occurred and in this case ARP poisoning can prevent such hackers from intercepting data.

In an exemplary implementation like that of FIG. 1D, an isolation system 10 is configured on the first device 20, the second device 22, and a server 24, allowing communications to the printer 26 at 192.168.1.40. In this Example, the printer 26 is only used to print monthly invoices and was erroneously configured to use DHCP instead of a static IP address.

When the printer 26 is turned off for several weeks, the DHCP lease is assigned to a new device on the network. When the new device, another printer (not shown) is turned on it gains the same IP address as the former printer but it has a different MAC address of: bb:bb:bb:bb:bb:01

When DHCP assigns the IP address to the second printer, the isolation system 10 can detect this because it knows the MAC address of the printer is: aa-aa-aa-aa-aa-01. Since this IP address is not allowed, the isolation system 10 clients can automatically block traffic to the new printer and can learn the MAC address of the old printer (if it is on, or when it comes back on).

Therefore, the system 10's clients can either learn the new IP address when it is assigned by an agent installed on the DHCP server or by periodically scanning the network.

Automating the response to network threats. Now that we understand how we can either eliminate or filter traffic. We can envision a cloud based platform 110 with a service running on endpoints. As changes are made in the cloud, endpoints pull down configuration changes and without human intervention, those endpoints adopt changes which dynamically change the configuration of the network. These changes can deny traffic to specific hosts, or restrict traffic based on what we can think of as dynamic firewall rules.

Since we have software running on all the endpoints, malicious traffic can be identified and this information can be contributed to our cloud service to allow dynamic, host-based reaction to things like malware or virus attacks.

Using host based collection systems can learn and identify zero-day events and other malicious activities based on network activity and file level auditing.

The isolation system 10 takes a novel approach by applying a binary talk/don't talk decision and configuring communications so that even unpatched systems are not vulnerable to network attack from systems that should not be attacking them in the first place.

The isolation system 10 can apply granular firewall rules to tweak existing security but the core goal of the technology is to eliminate peer-to-peer communications altogether where possible.

Example: Using Route Poisoning to Block Communications with Computers on the Same LAN Segment by Combining Null Routing and ARP Poisoning On an exemplary PC, the isolation system has an Ethernet adapter with the IP address 192.168.1.1 which has a network mask of 255.255.255.0.

Assume another PC on the same network, which has an IP address of 192.168.1.2 and has a network mask of 255.255.255.0.

These two computers have firewall rules permitting traffic between them. These computers can ping each other.

Now, the isolation system will intentionally create a poisoned route and demonstrate that the isolation system 10 can intentionally break communications between these two devices.

In One Step, as Described Above, the System Clears the Local ARP Table:

C: \>arp–d

Examine Local ARP Table:

C: \>arp–a

No ARP Entries Found.

Ping Target Computer:

C: \>ping 192.168.1.2

Pinging 192.168.1.2 with 32 Bytes of Data:

Reply from 192.168.1.2: bytes=32 time<1 ms TTL=128

Reply from 192.168.1.2: bytes=32 time<1 ms TTL=128

Reply from 192.168.1.2: bytes=32 time<1 ms TTL=128

Reply from 192.168.1.2: bytes=32 time<1 ms TTL=128

Ping Statistics for 192.168.1.2:

Packets: Sent=4, Received=4, Lost=0 (0% loss), Approximate round trip times in milli-seconds:

Minimum=0 ms, Maximum=0 ms, Average=0 ms

Re-Examine ARP Table; Now Know the MAC Address of the Target computer:

C: \>arp—a

Interface: 192.168.1.1 —0xb

| Internet Address | Physical Address | Type |
|---|---|---|
| 192.168.1.2 | 70-71-bc-03-0a-d0 | dynamic |
| 239.255.255.250 | 01-00-5e-7f-ff-fa | static |

The System 10 Now Clears the ARP Table:

C: \>arp–d

Next, the isolation system creates a poisoned ARP entry for a random IP address the isolation system has chosen. This is the 'poisoned gateway' and assigned the ARP entry to the Ethernet interface index which value is 11:

C: \>netsh interface ip add neighbors "11" 10.10.10.77 aa-bb-cc-11-22-33

It is understood that Windows® does not confirm the command, so the isolation system can verify that it was stored by running it again. This second time Windows® informs us that the object already exists.

C: \>netsh interface ip add neighbors "11" 10.10.10.77 aa-bb-cc-11-22-33 The object already exists.

The System then Examines the ARP Table to Ensure the Poisoned Gateway Entry Exists:

C: \>arp—a

Interface: 192.168.1.1—0xb

| Internet Address | Physical Address | Type |
|---|---|---|
| 10.10.10.77 | aa-bb-cc-11-22-33 | static |

The system now creates a poisoned route to the target computer, via the poisoned gateway. "if 11" corresponds to the Ethernet adapter's interface position on the PC:

C: \>route-p add 192.168.1.2 mask 255.255.255.255 10.10.10.77 if 11

OK!; Windows® responds that the route has been created

The System Now Tries to Ping the Target PC with the Poisoned Route in Place:

PS C: \>ping 192.168.1.2

Pinging 192.168.1.2 with 32 bytes of data:

Request timed out.

Request timed out.

Request timed out.

Request timed out.

Ping Statistics for 192.168.1.2:

Packets: Sent=4, Received=0, Lost=4 (100% loss),

Ping Statistics for 192.168.1.253:

Packets: Sent=4, Received=0, Lost=4 (100% loss),

Re-Examine the ARP Table:

PS C: \>arp—as

Interface: 192.168.1.1—0xb

| Internet Address | Physical Address | Type |
|---|---|---|
| 10.10.10.77 | aa-bb-cc-11-22-33 | static |
| 192.168.1.2 | 70-71-bc-03-0a-d0 | dynamic |
| 239.255.255.250 | 01-00-5e-7f-ff-fa | static |

The Isolation System then Examines the Route Table as Follows:

C: \>Route print

```
===========================================================================
Interface List
11...20 25 64 d6 b1 34 ......Realtek PCIe GBE Family Controller
1...........................Software Loopback Interface 1
12...00 00 00 00 00 00 00 e0 Microsoft ISATAP Adapter
===========================================================================
IPv4 Route Table
===========================================================================
Active Routes:
Network Destination    Netmask            Gateway          Interface      Metric
0.0.0.0                0.0.0.0            192.168.1.254    192.168.1.1    276
127.0.0.0              255.0.0.0          On-link          127.0.0.1      306
127.0.0.1              255.255.255.255    On-link          127.0.0.1      306
127.255.255.255        255.255.255.255    On-link          127.0.0.1      306
192.168.1.0            255.255.255.0      On-link          192.168.1.1    276
192.168.1.1            255.255.255.255    On-link          192.168.1.1    276
192.168.1.2            255.255.255.255    10.10.10.77      192.168.1.1     21
192.168.1.255          255.255.255.255    On-link          192.168.1.1    276
224.0.0.0              240.0.0.0          On-link          127.0.0.1      306
224.0.0.0              240.0.0.0          On-link          192.168.1.1    276
255.255.255.255        255.255.255.255    On-link          127.0.0.1      306
255.255.255.255        255.255.255.255    On-link          192.168.1.1    276
===========================================================================
Persistent Routes:
Network Address        Netmask            Gateway Address  Metric
0.0.0.0                0.0.0.0            192.168.1.254    Default
192.168.1.2            255.255.255.255    10.10.10.77      1
===========================================================================
```

The Isolation System can then Remove the Poisoned Route and the Poisoned Gateway Entry, Restoring the Computer Back to Normal:

C: \>route delete 192.168.1.2 OK!

C: \>netsh interface ip delete neighbors "11" 10.10.10.77 aa-bb-cc-11-22-33 OK.

The isolation system then tests communications to establish that the system is operating normally:

C: \>ping 192.168.1.2

Pinging 192.168.1.2 with 32 bytes of data:

Reply from 192.168.1.2: bytes=32 time<1 ms TTL=128

Reply from 192.168.1.2: bytes=32 time<1 ms TTL=128

Reply from 192.168.1.2: bytes=32 time<1 ms TTL=128

Reply from 192.168.1.2: bytes=32 time<1 ms TTL=128

Ping Statistics for 192.168.1.2:

Packets: Sent=4, Received=4, Lost=0 (0% loss),

Approximate round trip times in milli-seconds: Minimum=0 ms, Maximum=0 ms, Average=0 ms Example: Preventing Lateral Movement While it may seem like a limitation of the isolation system 10 that a hacker who gains administrative rights can remove settings from a host protected by the isolation system 10, even if the isolation system 10 were removed from a single PC, the hacker will not be able to move laterally within the LAN segment by connecting to other PC's protected by the isolation system 10. This however would not prevent the hacker from attempting to traverse the network to accessible servers which were not blocked by the system 10, but the isolation system 10 dramatically reduces the ability of the hacker to move laterally by blocking access to workstations blocked by the isolation system 10. Servers can be placed on other network segments protected by firewalls, and other techniques (outside the scope of this document) can be used to prevent pass the hash and other attacks, but those are not within the scope of this patent application.

Example: Dynamic Blocking

Dynamically blocking or allowing traffic based on higher level functions such as domain authentication is possible, for example by using Windows® Firewall. Dynamically blocking devices depending on whether or not if a user is authenticated and in-session, or blocking hosts dynamically when the user is logged off or when the Windows® session is locked is well within the possibilities of the isolation system 10. As an example of this, a user may need and desire access to printers while logged in but may have no valid reason to communicate with printers when their Windows® session is locked, or when they are logged off. By integrating the isolation system 10 techniques, dynamic behavior can easily be achieved. Using a combination of these methods, a much higher level of intra-LAN security can be achieved.

Further Examples: Use Cases

A hospital guest workstation used on secure LAN. In this illustrative Example, a hospital has waiting areas throughout the hospital. There is only a single shared LAN segment but they are concerned about guests using guest workstations and want to prevent those guest workstations from being able to access any staff PC, server, security cameras, or from accessing other medical equipment installed on the shared LAN. The guest PC vendor uses the isolation system and configures it so that workstations within each waiting area can access the Internet and so they have the ability to print documents to the printer near them, but so they cannot see or access any other equipment in the hospital. The Hospital is using 172.16.0.0/16 as their network so the number of potential devices is large (65,535). The guest PC vendor decides to combine the Route poisoning and Binary Firewall rule methods of The isolation system to ensure that a guest using the PC does not have any ability to access any other host, server, security cameras or medical device on the LAN segment. Guest PC's are successfully deployed and security is tested by scanning the network, these PCs can access the Internet and print but have no visibility to secure devices within the hospital.

A PC in a dormitory or apartment building. In these settings it may be desirable to access the Internet and a user's personal devices such as a user's printer and HDTV and the Internet but prevent other computers on the network from being able to make connections to a user's PC. By using the isolation system on a user's PC, connections from all undesired computers and devices can be blocked.

Legacy workstation used for a control application on a shared LAN. In this illustrative Example, a Heating Ventilating and Air Conditioning (HVAC) company has a computer which is out of support but which is controlling the heating system in a High School building. The High School has only one network segment which is shared by students and staff. The HVAC computer must connect to thermostats, and individual furnaces located throughout the building. Budget and technical limitations prevent the HVAC system from installing their own network, and also prevent the computer from being upgraded. The isolation system can be used on the HVAC control PC, to allow it to communicate with the necessary devices on the network and while simultaneously blocking connectivity to other devices such as student and staff computers. This protects the old operating system from falling prey to malware or other attacks which may be on the LAN.

High security workstation used for secure banking on a shared LAN. In this Example, a company wants to install a PC which will be dedicated to electronic banking. They only have a single LAN and don't have the ability to install or provision another LAN segment, yet they want to eliminate the possibility that someone can use a MIM (Man in the Middle) attack to capture traffic to/from this secure banking PC. The isolation system can be used to allow this banking PC to speak only to the Internet and not allowing it to connect to or receive connections from any other host or device on the LAN.

Student PCs on a shared LAN segment. A school district has only one LAN segment and desires to make it impossible for a student using a student PC from being able to connect to or to attack other users on the LAN. The school also wants to restrict access to their electronic records system from the students which are hosted on a dedicated file server. The school needs students to be able to access files from student file servers and needs students to be able to print documents as well as to access the Internet. This can be achieved with the isolation system.

A SCADA vendor has a number of IoT devices. A Supervisory Control And Data Acquisition (SCADA) system vendor has a number of devices in a water plant. These devices are on the same LAN segment as the PCs used by employees. There are 35 employee computers on the network and a number of printers, HDTV's and other devices. US Cert issues and alert to Utility companies to isolate SCADA networks so that they cannot be attacked, but due to the complexity and budget considerations, these changes can take years to implement. The utility company decides to implement The isolation system on all of the SCADA devices. The SCADA devices are dedicated appliances without advanced routing or firewall capabilities. It is determined that the ARP poisoning method of The isolation system can be implemented by assigning fixed IP addresses to the management PCs who need to access the SCADA controllers, and that using poisoned ARP entries the other SCADA controllers can be configured to only allow communication with other necessary SCADA controllers. The isolation system is an effective solution to provide a much-needed layer of security without needing to redesign the entire network or replace an expensive SCADA system.

Enhanced Intra-LAN Security for Business. A business with a single shared LAN segment wants to limit traffic to allow Engineering computers to print to Engineering printers and to access Engineering servers, and to similarly restrict other computers placing them in logical groups. With this methodology, the company can dramatically reduce the possibility that a hacker can traverse the network laterally, and they can simultaneously dramatically reduce the risk of cryptographic malware from traversing across all of the computers on the shared LAN segment. The isolation system can be used to provide the additional security required without the expense of replacing their existing Ethernet switches or adding additional VLANS to segment traffic.

Virtual Windows® based Internet server on a DMZ, Windows® Server running on VMWare: This Example involves a server installed on a DMZ network. This server is a virtualized web server running Windows® on VMWare. The goal is to prevent anyone who could attack or take over the web server from being able to access other hosts on the same Ethernet segment. The goal is to allow internet communications to and from our web server while preventing the web server from sending or receiving traffic to other servers. The DMZ network is 2.2.2.96/27, the web server is 2.2.2.100 and the gateway is 2.2.2.97. The system 10 is configured to have other servers that are active on the DMZ with IP's in the 2.2.2.96/27 range. The system 10 is configured to create entries that block connections to all the other servers. The system 10 is configured to provide the additional security required without the expense of replacing their existing Ethernet switches or adding additional VLANS to segment traffic.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Although the disclosure has been described with reference to preferred embodiments, persons skilled in the art will recognize that changes may be made in form and detail without departing from the spirit and scope of the disclosed apparatus, systems and methods.

What is claimed is:

1. A system for isolation of a local area network (LAN) comprising a plurality of network devices comprising a default gateway, a first host, and a second host, the system comprising:

a device comprising a hardware processor configured to execute a series of executable steps on the first host to allow communications with whitelist devices on the LAN and to prevent communications with the second host via ARP poisoning and one or more of route poisoning, null routing, and blackhole routing, wherein the route poisoning and null routing are applied to a data link layer or network layer, wherein the ARP poisoning comprises:

clearing an ARP table of the first host;

determining a valid host IP address space of the LAN:

determining a whitelist comprising IP addresses for all whitelist devices on the LAN, the whitelist devices comprising the default gateway; and creating a false entry in the ARP table of the first host for each IP address within the valid host IP address space not in the whitelist, the false entry comprising a MAC address that is not the MAC address of any of the plurality of network devices on the LAN.

2. The system of claim 1, wherein the device processor is configured to enforce firewall rules on the first host on at least one of a transport layer, a session layer, a presentation layer, or an application layer.

3. The system of claim 1, wherein the first host comprises the device comprising the hardware processor.

4. The system of claim 1, wherein the first host is a virtualized server.

5. The system of claim 1, wherein the device comprising the hardware processor is configured to establish and enforce additional endpoint rules preventing communications with the network devices not on the whitelist.

6. The system of claim 5, wherein the whitelist comprises a printer.

7. The system of claim 1, wherein the device processor is configured to execute:

a series of executable steps on the second host to prevent communications with the first host via ARP poisoning and one or more of route poisoning, null routing, and blackhole routing.

8. The system of claim 7, wherein the device processor is configured to enforce firewall rules on the second host.

9. A local area network host isolation system comprising:

a. a local area network (LAN) comprising a plurality of network devices comprising a default gateway, a first host, and a second host; and b. a hardware processor, the hardware processor constructed and arranged to establish and enforce rules on the first and second hosts to allow communications with whitelist devices on the LAN and to prevent peer-to-peer communications within the LAN by implementing ARP poisoning and route poisoning, wherein the ARP poisoning comprises:

clearing an ARP table of the first host;

determining a valid host IP address space of the LAN;

determining a whitelist comprising IP addresses for all whitelist devices on the LAN, the whitelist devices comprising the default gateway; and creating a false entry in the ARP table of the first host for each IP address within the valid host IP address space not in the whitelist, the false entry comprising a MAC address that is not the MAC address of any of the plurality of network devices on the LAN; and implementing, with device comprising the hardware processor, two or more of route poisoning, null routing, and firewall rules, wherein the route poisoning and null routing are applied to a data link layer or network layer, and the firewall rules are applied to a transport layer, a session layer, a presentation layer, or an application layer.

10. The system of claim 9, wherein the first host and second host are connected to the internet via the default gateway.

11. The system of claim 9, wherein the platform is constructed and arranged for establishing and enforcing firewall rules on local area network hosts to prevent peer-to-peer communications between the hosts.

12. The system of claim 9, wherein the ARP poisoning further comprises:

clearing an ARP table of the second host; and creating a false entry in the ARP table of the second host for each IP address within the valid host IP address space not in the whitelist, the false entry comprising a MAC address that is not the MAC address of any of the plurality of network devices on the LAN.

13. The system of claim 11, wherein the whitelisted devices comprise at least one of a default gateway, a server, a host and a printer and blacklist the first host on the second host.

14. The system of claim 11, wherein the device processor is configured to establish and enforce rules applied to at least one of a data link layer or a network layer.

15. A method of isolating hosts on a local area network (LAN) comprising:

allowing a first host communicating with whitelist devices on the LAN and to prevent communications with a second host via ARP poisoning the first host on the LAN with a device comprising a hardware processor, comprising:

clearing an ARP table of the first host;

determining a valid host IP address space of the LAN:

determining a whitelist comprising IP addresses for all whitelist devices on the LAN the whitelist devices comprising the fault gateway; and creating a false entry in the ARP table of the first host for each IP address within the valid host IP address space not in the whitelist, the false entry comprising a MAC address that is not the MAC address of any network devices on the LAN; and implementing, with the device comprising the hardware processor, two or more of route poisoning, null routing, and firewall rules, wherein the route poisoning and null routing are applied to a data link layer or network layer, and the firewall rules are applied to a transport layer, a session layer, a presentation layer, or an application layer.

16. The method of claim 15, further comprising detecting a network intrusion based on detecting a SYN-ACK message from the first host.

17. The method of claim 15, further comprising implementing a route based intrusion detection system.

18. The method of claim 15, further comprising detecting a network intrusion with a network sensor.

* * * * *